United States Patent
Dan et al.

(10) Patent No.: US 12,397,713 B2
(45) Date of Patent: Aug. 26, 2025

(54) DRIVE ASSISTANCE SYSTEM

(71) Applicant: HONDA MOTOR CO., LTD., Tokyo (JP)

(72) Inventors: Koji Dan, Saitama (JP); Toshiaki Seo, Saitama (JP); Takaya Yamazaki, Saitama (JP); Minoru Higuchi, Saitama (JP); Aya Sasaki, Saitama (JP); Shinichi Murakami, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 122 days.

(21) Appl. No.: 18/414,472

(22) Filed: Jan. 17, 2024

(65) Prior Publication Data

US 2024/0246489 A1     Jul. 25, 2024

(30) Foreign Application Priority Data

Jan. 20, 2023 (JP) ................. 2023-007601

(51) Int. Cl.
*B60R 1/28* (2022.01)
*G06T 11/00* (2006.01)
(Continued)

(52) U.S. Cl.
CPC ............ *B60R 1/28* (2022.01); *G06T 11/00* (2013.01); *G08G 1/16* (2013.01);
(Continued)

(58) Field of Classification Search
CPC ............ B60R 1/28; B60R 2300/102; B60R 2300/105; B60R 2300/605;
(Continued)

(56) References Cited

U.S. PATENT DOCUMENTS

| 7,974,748 B2 * | 7/2011 | Goerick | G06V 20/58 |
| | | | 701/28 |
| 9,013,286 B2 * | 4/2015 | Chen | G08G 1/16 |
| | | | 348/148 |

(Continued)

FOREIGN PATENT DOCUMENTS

JP        2010191793 A      9/2010

*Primary Examiner* — Gertrude Arthur Jeanglaude
(74) *Attorney, Agent, or Firm* — CKC & PARTNERS CO., LLC

(57) ABSTRACT

A drive assistance system includes a display object configurator that sets, as a display object or a non-display object, each of traffic participants recognized as alert objects from among nearby traffic participants, and a display controller that performs highlight image processing for highlighting the presence of the display object. When a first traffic participant set as the display object and a second traffic participant set as the non-display object are present in the vicinity of the subject vehicle and recognized as alert objects with the recognition of the first traffic participant by the driver being detected while the highlight image processing is performed, the display object configurator compares the degrees of influence of the first and second traffic participants, sets, as the display object, one of the first and second traffic participants designated on the basis of a result of the comparison, and sets the other as the non-display object.

17 Claims, 8 Drawing Sheets

(51) Int. Cl.
*G08G 1/16* (2006.01)
*G06V 20/59* (2022.01)

(52) U.S. Cl.
CPC ... *B60R 2300/102* (2013.01); *B60R 2300/105* (2013.01); *B60R 2300/605* (2013.01); *B60R 2300/8093* (2013.01); *G06V 20/597* (2022.01)

(58) Field of Classification Search
CPC ... B60R 2300/8093; G06T 11/00; G08G 1/16; G06V 20/597
See application file for complete search history.

(56) References Cited

U.S. PATENT DOCUMENTS

| | | | |
|---|---|---|---|
| 10,017,114 B2* | 7/2018 | Bongwald | B60R 1/26 |
| 2016/0140614 A1* | 5/2016 | Brubaker | G06Q 30/0266 |
| | | | 705/14.62 |

* cited by examiner

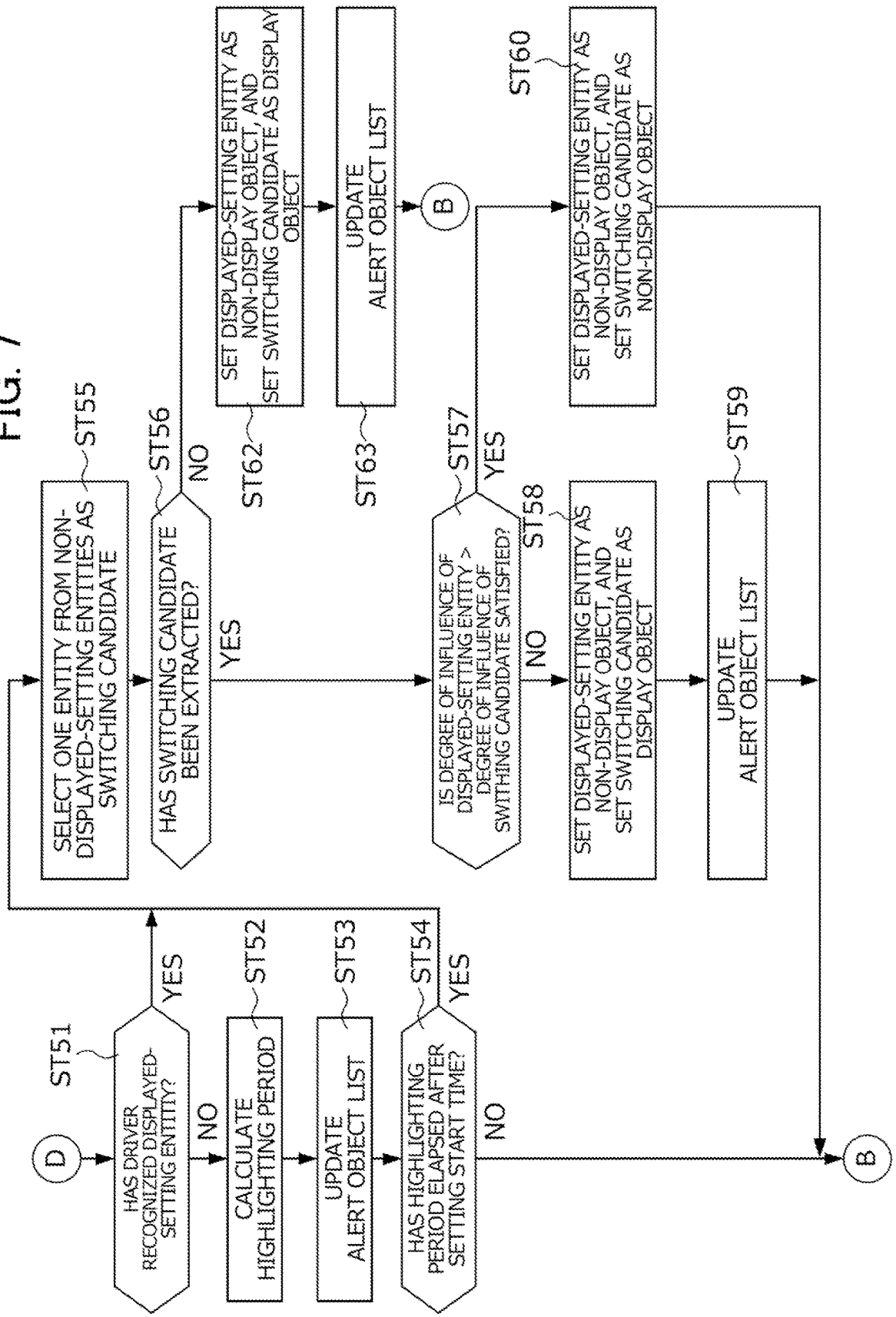

FIG. 8

ALERT OBJECT RECOGNITION COUNT = 3

| IDENTIFICATION NUMBER OF NEARBY TRAFFIC PARTICIPANT | RECOGNITION TIME (YEAR/MONTH/DAY/HOUR /MINUTE/SECOND) | DEGREE OF INFLUENCE (LATEST) | DISPLAY OBJECT FLAG | SETTING START TIME (YEAR/MONTH/DAY/HOUR /MINUTE/SECOND) | HIGHLIGHTING PERIOD | RELEASE FLAG | DEGREE OF INFLUENCE (DURING RELEASED SETTING) |
|---|---|---|---|---|---|---|---|
| aaa | a1/b1/c1/d1/e1/f1 | xxx | ON | A1/B1/C1/D1/E1/F1 | G SECONDS | OFF | --- |
| bbb | a1/b1/c1/d1/e2/f2 | yyy | OFF | --- | --- | OFF | --- |
| ccc | a1/b1/c1/d1/e3/f3 | zzz | OFF | --- | --- | ON | sss |

DRIVE ASSISTANCE SYSTEM

This application is based on and claims the benefit of priority from Japanese Patent Application No. 2023-007601, filed on 20 Jan. 2023, the content of which is incorporated herein by reference.

BACKGROUND OF THE INVENTION

Field of the Invention

The present invention relates to a drive assistance system. More particularly, the present invention relates to a drive assistance system that recognizes, as an alert object, a nearby traffic participant having a high degree of influence on the safe travel of a subject vehicle, and encourages the driver of the subject vehicle to recognize the alert object.

Related Art

In recent years, attempts have been actively made to provide access to a sustainable transport system designed with consideration for people in a vulnerable position from among traffic participants. To achieve this, efforts have been concentrated on research and development for further improving the safety and convenience of traffic through research and development pertaining to drive assistance techniques for assisting drivers to grasp the situation of their surroundings.

In the drive assistance technique disclosed in Patent Document 1, if a risky object having the risk of colliding with a subject vehicle is detected on the basis of an image of the vicinity of the subject vehicle, a display displays a first warning image in which the risky object is highlighted, so as to encourage the driver of the subject vehicle to recognize the risky object. In this drive assistance technique, in addition, in order to prevent the driver from feeling bothered due to the first warning image being continuously displayed, when the driver has checked the risky object after the first warning image is displayed, the displaying of the first warning image is stopped, and a second warning image, which has a lower degree of highlighting than the first warning image, is displayed.

Patent Document 1: Japanese Unexamined Patent Application, Publication No. 2010-191793

SUMMARY OF THE INVENTION

In the meantime, Patent Document 1 does not sufficiently consider situations in which a plurality of risky objects that have the risk of colliding with the subject vehicle are concurrently present. If a plurality of risky objects are concurrently present like this, a plurality of warning images may be displayed in accordance with the number of risky objects. However, concurrently displaying a plurality of warning images could confuse the driver.

An object of the present invention is to provide a drive assistance system capable of allowing the driver to recognize the presence of a plurality of alert objects that could affect the safe travel of the subject vehicle, without confusing the driver. Ultimately, an object of the present invention is to contribute to the development of a sustainable transport system.

(1) A drive assistance system according to the present invention includes: an external-area recognition device that recognizes traffic participants in the vicinity of a subject vehicle as nearby traffic participants; an alert object recognizer that recognizes, as an alert object, an entity having a high degree of influence on the safe travel of the subject vehicle from among the traffic participants recognized as the nearby traffic participants; a display object configurator that sets, as a display object or a non-display object, each of the traffic participants recognized as the alert objects; a display controller that performs, for a display provided at a location capable of being viewed by the driver of the subject vehicle, highlight image processing for highlighting the presence of the traffic participant set as the display object; and a driver-recognition detection device that detects whether the driver has recognized the nearby traffic participants. When a first traffic participant set as the display object and a second traffic participant set as the non-display object are present in the vicinity of the subject vehicle and recognized as the alert objects with recognition of the first traffic participant by the driver being detected while the highlight image processing is performed, the display object configurator compares the degrees of influence of the first and second traffic participants, sets, as the display object, one of the first and second traffic participants designated on the basis of a result of the comparison, and sets the other as the non-display object.

(2) In this case, it is preferable that the display object configurator sets, as the display object, only one entity from among the plurality of traffic participants recognized as the alert objects, and sets the remaining entities as the non-display objects.

(3) In this case, it is preferable that the display object configurator sets, as the display object, the traffic participant having the higher degree of influence from among the first and second traffic participants, and sets the traffic participant having the lower degree of influence as the non-display object.

(4) In this case, when a first degree of influence of the first traffic participant is lower than a second degree of influence of the second traffic participant, it is preferable that the display object configurator sets the first traffic participant as the non-display object, and sets the second traffic participant as the display object.

(5) In this case, when the first degree of influence is higher than the second degree of influence, it is preferable that the display object configurator continuously sets the first traffic participant as the display object, and continuously sets the second traffic participant as the non-display object.

(6) In this case, when the first degree of influence is equal to the second degree of influence, it is preferable that the display object configurator sets the first traffic participant as the non-display object, and sets the second traffic participant as the display object.

(7) In this case, it is preferable that: the external-area recognition device acquires movement state information pertaining to the movement state of the nearby traffic participants; and the alert object recognizer or the display object configurator calculates the first and second degrees of influence on the basis of the movement state information.

(8) In this case, it is preferable that the driver-recognition detection device includes an imaging device for imaging the face of the driver, and detect whether the driver has recognized the nearby traffic participants on the basis of image data acquired by the imaging device.

(9) In this case, it is preferable that the alert object recognizer or the display object configurator detects or predicts the behavior of the first and second traffic participants on the basis of the movement state information, and calculates the first and second degrees of influence on the basis of a result of the detection or prediction.

(10) In this case, it is preferable that: the external-area recognition device acquires traffic environment information pertaining to the traffic environment of the vicinity of the subject vehicle; and the alert object recognizer or the display object configurator predicts the behavior of the first and second traffic participants on the basis of the traffic environment information.

(11) In this case, it is preferable that: the drive assistance system further comprises a driver-state acquisition device that acquires driver state information correlated with the driving ability of the driver; and the alert object recognizer or the display object configurator calculates the first and second degrees of influence on the basis of the movement state information and the driver state information.

(12) In this case, it is preferable that, in response to detection of the driver recognizing a third traffic participant set as the display object, the display object configurator sets the third traffic participant as the non-display object, and then sets the third traffic participant as the display object again if the degree of influence of the third traffic participant has increased in comparison to a time point at which the third traffic participant was set as the non-display object or a time point at which the recognition by the driver was detected.

(13) In this case, it is preferable that: when the display object configurator has set, as the display object, a fourth traffic participant recognized as the alert object and then a prescribed highlighting period has elapsed or the recognition of the display object by the driver has been detected, the display object configurator sets the fourth traffic participant as the non-display object; and the highlighting period be set on the basis of the degree of influence of the fourth traffic participant.

(14) In this case, it is preferable that: the external-area recognition device acquires traffic environment information pertaining to the traffic environment of the vicinity of the subject vehicle; the alert object recognizer recognizes, as the alert object, an entity having the degree of influence that is greater than a prescribed degree-of-influence threshold from among the traffic participants recognized as the nearby traffic participants; and the degree-of-influence threshold be set on the basis of the traffic environment information.

(15) In this case, it is preferable that: the drive assistance system further includes a driver-state acquisition device that acquires driver state information correlated with the driving ability of the driver; the alert object recognizer recognizes, as the alert object, an entity having the degree of influence that is greater than a prescribed degree-of-influence threshold from among the traffic participants recognized as the nearby traffic participants; and the degree-of-influence threshold be set on the basis of the driver state information.

(16) In this case, it is preferable that: the display includes a forward display for showing an image of an area forward of the subject vehicle; and in the highlight image processing, the display controller establishes, as a forward display region, a portion of the forward display that shows an image of the display object, and displays a highlight image within the forward display region in an overlaid manner so as to highlight the presence of the display object.

(17) In this case, it is preferable that: the display includes a rearward display for showing an image of an area rearward of the subject vehicle; and in the highlight image processing, the display controller establishes, as a rearward display region, a portion of the rearward display that shows an image of the display object, and displays a highlight image within the rearward display region in an overlaid manner so as to highlight the presence of the display object.

(1) In the present invention, the external-area recognition device recognizes traffic participants in the vicinity of a subject vehicle as nearby traffic participants; the alert object recognizer recognizes, as an alert object, an entity having a high degree of influence on the safe travel of the subject vehicle from among the traffic participants recognized as the nearby traffic participants; the display object configurator sets, as a display object or a non-display object, each of the traffic participants recognized as the alert objects; and the display controller performs, for the display capable of being viewed by the driver, highlight image processing for highlighting the presence of the traffic participant set as the display object. In the present invention, accordingly, when an alert object having a high degree of influence on the safe travel of the subject vehicle is present in the vicinity of the subject vehicle and set as a display object, the highlight image processing is performed to highlight the presence of the alert object (display object) on the display, so that the driver can easily recognize the presence of the alert object. In the present invention, when a first traffic participant set as the display object and a second traffic participant set as the non-display object are present in the vicinity of the subject vehicle and recognized as the alert objects with recognition of the first traffic participant by the driver being detected while the highlight image processing for the first traffic participant is performed, the display object configurator compares the degrees of influence of the first and second traffic participants, sets, as the display object, one of the first and second traffic participants designated on the basis of a result of the comparison, and sets the other as the non-display object. Thus, in the present invention, when a plurality of traffic participants have been recognized as alert objects, a display object and a non-display object are selectively set in accordance with the result of detection of the recognition by the driver and the result of comparison between the degrees of influence. In the present invention, accordingly, the highlight image processing is not performed for all the traffic participants recognized as alert objects, so that the driver can be prevented from being confused and from feeling bothered. In the present invention, furthermore, every time the recognition of a display object by the driver is detected, the degrees of influence of a plurality of alert objects are compared, and an alert object to be set as a display object and an alert object to be set as a non-display object are determined on the basis of the result of comparison, thereby allowing for determining an alert object that the driver should be encouraged to recognize while preventing the driver from being confused and from feeling bothered, so that the safe driving by the driver can be assisted. This arrangement can also contribute to the development of the sustainable transport system.

(2) In the present invention, the display object configurator sets, as the display object, only one entity from among the plurality of traffic participants recognized as the alert objects, and sets the remaining entities as the non-display objects. In the present invention, accordingly, even when a plurality of traffic participants have been recognized as alert objects, the highlight image processing only for one of the traffic participants is performed, so that the driver can be prevented from being confused and from feeling bothered.

(3) In the present invention, when the recognition, by the driver, of the first traffic participant set as a display object is detected while the highlight image processing for the first traffic participant is performed, the display object configurator sets, as a display object, one of the first and second traffic participants that has the higher degree of influence, and sets the one having the lower degree of influence as a non-display object. In the present invention, accordingly, the driver can be encouraged to recognize one of the first and second traffic participants that has the higher degree of influence, so that the safe driving by the driver can be assisted.

(4) In the present invention, when the recognition of the first traffic participant, which has been set as a display object, by the driver is detected while the highlight image processing for the first traffic participant is performed, the display object configurator compares the first degree of influence of the first traffic participant with the second degree of influence of the second traffic participant. When the first degree of influence is lower than the second degree of influence, the display object configurator sets the first traffic participant as the non-display object, and sets the second traffic participant, which has the higher degree of influence, as the display object. In the present invention, accordingly, the driver can be encouraged to recognize the second traffic participant, which has the higher degree of influence from among the first and second traffic participants, so that the safe driving by the driver can be assisted.

(5) In the present invention, when the recognition of the first traffic participant, which has been set as a display object, by the driver is detected while the highlight image processing is performed for the first traffic participant, the display object configurator compares the first degree of influence of the first traffic participant with the second degree of influence of the second traffic participant. When the first degree of influence is higher than the second degree of influence, the display object configurator continuously sets the first traffic participant as a display object, and continuously sets the second traffic participant, which has the lower degree of influence, as a non-display object. In the present invention, accordingly, the highlight image processing for the first traffic participant is continuously performed even after the driver has recognized the first traffic participant, thereby allowing the driver to be encouraged to recognize the first traffic participant, which has the higher degree of influence, so that the safe driving by the driver can be assisted.

(6) In the present invention, when recognition of the first traffic participant, which has been set as a display object, by the driver is detected while the highlight image processing for the first traffic participant is performed, the display object configurator compares the first degree of influence of the first traffic participant with the second degree of influence of the second traffic participant. When the first degree of influence is equal to the second degree of influence, the display object configurator sets the first traffic participant, which has already been recognized by the driver, as a non-display object, and sets the second traffic participant, which has not been recognized by the driver yet, as a display object. In the present invention, accordingly, when the degrees of influence of the first and second traffic participants are equal, the driver can be encouraged to recognize the second traffic participant that has not been recognized by the driver yet, so that the safe driving by the driver can be assisted.

(7) In the present invention, the alert object recognizer or the display object configurator calculates the first and second degrees of influence on the basis of movement state information pertaining to the movement state of nearby traffic participants. In the present invention, accordingly, the degrees of influence on the safe travel of the subject vehicle can be accurately calculated in consideration of the movement state of the first and second traffic participants, so that an entity that should be recognized by the driver without fail, from among the first and second traffic participants, can be set as a display object.

(8) In the present invention, the driver-recognition detection device can detect that the driver has visually recognized a nearby traffic participant by detecting whether the driver has recognized the nearby traffic participant on the basis of image data pertaining to the face of the driver.

(9) In the present invention, the alert object recognizer or the display object configurator detects or predicts the behavior of the first and second traffic participants on the basis of the movement state information pertaining to nearby traffic participants, and calculates the first and second degrees of influence on the basis of a result of the detection or prediction. In the present invention, accordingly, the first and second degrees of influence can be accurately calculated with the result of detection or prediction of the behavior of the first and second traffic participants being reflected, so that an entity that should be recognized by the driver without fail, from among the first and second traffic participants, can be set as a display object.

(10) In the present invention, the alert object recognizer or the display object configurator predicts the behavior of the first and second traffic participants on the basis of traffic environment information pertaining to a traffic environment of the vicinity of the subject vehicle, so that the alert object recognizer or the display object configurator can accurately predict the behavior of the first and second traffic participants and can accurately calculate the first and second degrees of influence in the end. In the present invention, accordingly, an entity that should be recognized by the driver without fail, from among the first and second traffic participants, can be set as a display object.

(11) In the present invention, the alert object recognizer or the display object configurator calculates the first and second degrees of influence on the basis of the movement state information and the driver state information, so that the alert object recognizer or the display object configurator can accurately calculate the first and second degrees of influence with the driving ability of the driver of the subject vehicle at that time being reflected. In the present invention, accordingly, an entity that should be recognized by the driver without fail, from among the first and second traffic participants, can be set as a display object.

(12) In the present invention, when the recognition of the third traffic participant, which has been set as a display object, by the driver is detected while the highlight image processing for the third traffic participant is performed, the display object configurator sets the third traffic participant as a non-display object, and ends the highlight image processing. In this way, the driver can be prevented from feeling bothered due to the highlight image processing continuing to be performed even after the driver has recognized the third traffic participant. Afterward, if the degree of influence of the third traffic participant has increased in comparison to a time point at which the third traffic participant was set as a non-display object or a time point at which the recognition by the driver was detected, the display object configurator sets the third traffic participant as a display object again and causes the highlight image processing to be started again. In the present invention, accordingly, even after the driver has recognized the third traffic participant, the highlight image processing for the same third traffic participant is performed in accordance with a later change in the situation, so that the safe travel of the driver can be assisted.

(13) In the present invention, when the display object configurator has set, as a display object, a fourth traffic participant recognized as an alert object and then a prescribed highlighting period has elapsed or the recognition of the display object by the driver has been detected, the display object configurator sets the fourth traffic participant as a non-display object, and ends the highlight image processing. In the present invention, accordingly, the driver can be prevented from feeling bothered due to the highlight image processing being performed continuously over a long period of time. In the present invention, moreover, the highlighting period is set on the basis of the degree of influence of the fourth traffic participant, so that the highlighting period can be set to an appropriate length for the degree of influence of the fourth traffic participant.

(14) In the present invention, the alert object recognizer recognizes, as an alert object, an entity having a degree of influence that is greater than a degree-of-influence threshold from among the traffic participants recognized as the nearby traffic participants, and sets the degree-of-influence threshold on the basis of the traffic environment information. In this way, the frequency with which the highlight image processing is performed can be changed in accordance with a change in the traffic environment of the vicinity of the subject vehicle, so that the driver can be prevented from feeling bothered due to the highlight image processing being frequently performed.

(15) In the present invention, the alert object recognizer recognizes, as an alert object, an entity having a degree of influence that is greater than a degree-of-influence threshold from among the traffic participants recognized as the nearby traffic participants, and sets the degree-of-influence threshold on the basis of driver state information. In this way, the frequency with which the highlight image processing is performed can be changed in accordance with the state of the driver at that time, so that the safe travel of the driver can be assisted.

(16) In the present invention, in the highlight image processing, the display controller establishes, as a forward display region, a portion of the forward display that shows an image of the display object, and displays a highlight image within the forward display region in an overlaid manner so as to highlight the presence of the display object. In this way, the driver can easily recognize the presence of a display object forward of the subject vehicle.

(17) In the present invention, in the highlight image processing, the display controller establishes, as a rearward display region, a portion of the rearward display that displays an image of the display object, and displays a highlight image within the rearward display region in an overlaid manner so as to highlight the presence of the display object. In this way, the driver can easily recognize the presence of a display object rearward of the subject vehicle.

BRIEF DESCRIPTION OF THE DRAWINGS

FIG. 7 is a flowchart illustrating a specific procedure of display/non-display setting processing by the display object configurator (example 4);

FIG. 8 illustrates an example of an alert object list stored in a storage region of the display object configurator.

DETAILED DESCRIPTION OF THE INVENTION

Figure 1:
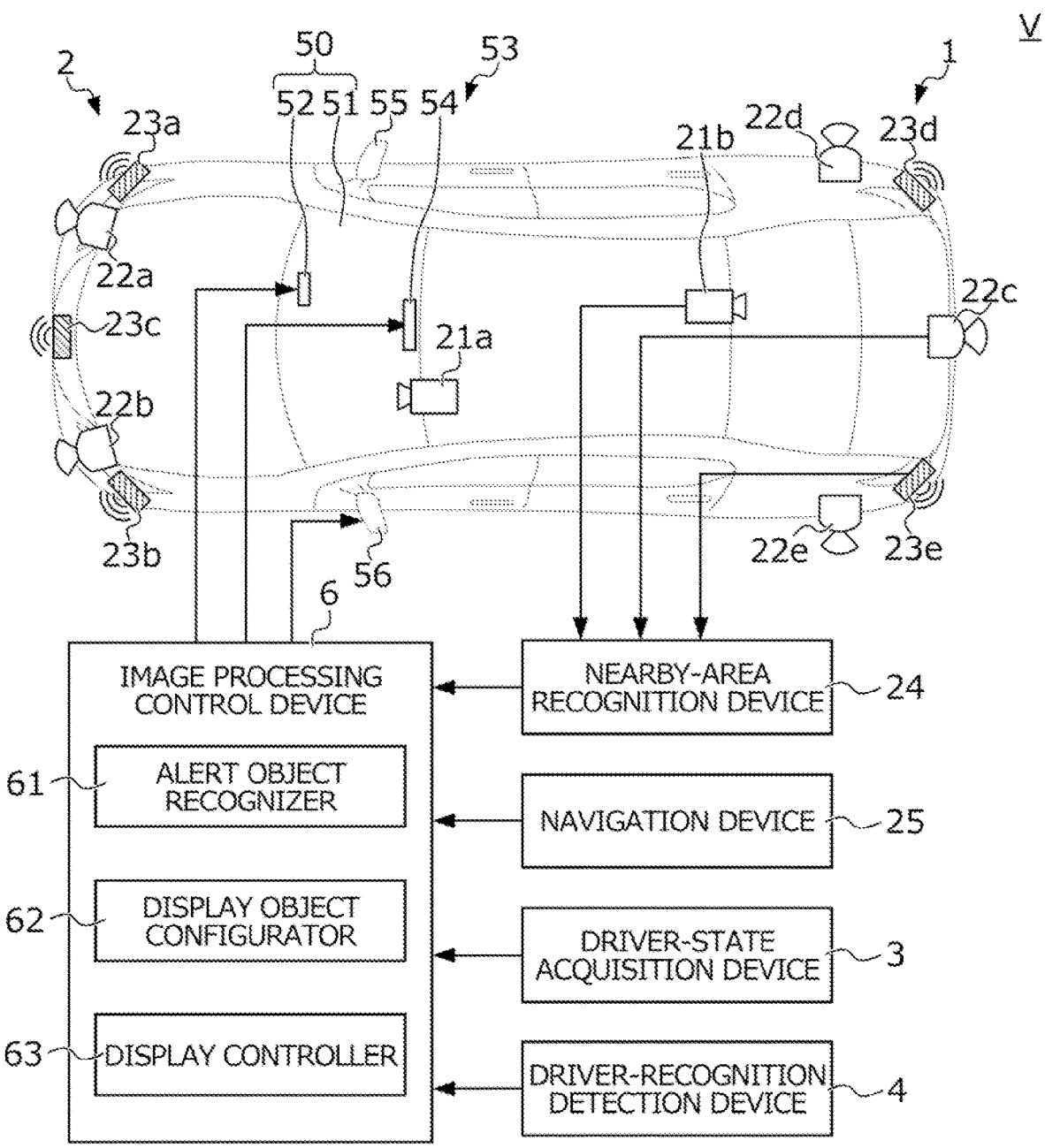
FIG. 1 schematically illustrates a drive assistance system according to one embodiment of the present invention and the configuration of a vehicle equipped with the drive assistance system.

The following describes a drive assistance system according to one embodiment of the present invention by referring to the drawings.

FIG. 1 schematically illustrates a drive assistance system 1 according to the present embodiment and the configuration of a subject vehicle V (hereinafter may simply be referred to as the "vehicle V") equipped with the drive assistance system 1. Although the following descriptions are given for a situation in which the vehicle V is a so-called right-hand-drive four-wheel vehicle in which the driver's seat on which the driver sits is provided on the right side in the vehicle width direction when seen in the travel direction, the present invention is not limited to this. The vehicle may be a so-called left-hand-drive four-wheel vehicle in which the driver's seat is provided on the left side in the vehicle width direction when seen in the travel direction.

The drive assistance system 1 recognizes traffic participants in the vicinity of the vehicle V as nearby traffic participants, recognizes, as alert objects, entities determined as having a high influence on the safe travel of the vehicle V from among one or more traffic participants recognized as the nearby traffic participants, and performs, for a display provided at a location capable of being viewed by the driver of the vehicle V, highlight image processing for highlighting the presence of the one or more alert objects, in order to assist the driver recognizing the presence of the alert objects. Although the following describes a situation in which the drive assistance system 1 is equipped in the vehicle V, which is a four-wheel car such as that depicted in FIG. 1, the present invention is not limited to this. In the present invention, the drive assistance system may be equipped in a truck or on a vehicle other than a four-wheel car, such as a straddle-type vehicle. When the drive assistance system is equipped on a straddle-type vehicle, among other vehicles, at least some components of the drive assistance system may be equipped on a helmet worn by the rider, i.e., driver. In the present embodiment, traffic participants refer to vehicles or entities such as pedestrians that move by their own will.

The drive assistance system 1 includes: a vehicle-mounted external-area recognition device 2 that recognizes a traffic participant (hereinafter may also be referred to as a "nearby traffic participant") present in the vicinity of the vehicle V (including a forward area in the travel direction, a rearward area in the travel direction, and both lateral areas) and the traffic environment of the vicinity of the vehicle V; a driver-state acquisition device 3 that acquires driver state information correlated with the driving ability of the driver; a driver-recognition detection device 4 that detects whether the driver has recognized the nearby traffic participant; a forward display 50 that shows an image of an area forward of the vehicle V; a rearward display 53 that shows an image of an area rearward of the vehicle V; and an image processing control device 6 that performs highlight image processing for the displays 50 and 53 on the basis of, for example, a recognition result provided by the vehicle-mounted external-area recognition device 2, the driver state information acquired by the driver-state acquisition device 3, and a detection result provided by the driver-recognition detection device 4.

The vehicle-mounted external-area recognition device 2 includes camera units 21a and 21b, a plurality of (e.g., five) lidar units 22a, 22b, 22c, 22d, and 22e, a plurality of (e.g., five) radar units 23a, 23b, 23c, 23d, and 23e, a nearby-area recognition device 24, and a navigation device 25.

The forward camera unit 21a and the rearward camera unit 21b include, for example, a digital camera relying on a solid-state imaging device, e.g., charge coupled device (CCD), complementary metal oxide semiconductor (CMOS), and image a forward area in the travel direction of the vehicle V and a rearward area in the travel direction. The camera units 21a and 21b are respectively attached to, for example, the roof of the vehicle V within the cabin so as to be oriented toward the forward area in the travel direction and the reward area in the travel direction. Images captured by the camera units 21a and 21b are transmitted to the nearby-area recognition device 24.

The lidar units 22a-22e are each a light detection and ranging (LIDAR) that measures scattering light from objects resulting from laser irradiation with pulsed light emission, so as to detect an object in the vicinity of the vehicle V. The first lidar unit 22a is provided on the right edge side of the front portion of the vehicle V when seen in the travel direction, and detects an object on a slightly rightward side of the forward area in the vicinity of the vehicle V. The second lidar unit 22b is provided on the left edge side of the front portion of the vehicle V when seen in the travel direction, and detects an object on a slightly leftward side of the forward area in the vicinity of the vehicle V. The third lidar unit 22c is provided at the center, in the vehicle width direction, of the rear portion of the vehicle V, and detects an object in the rearward area in the vicinity of the vehicle V. The fourth lidar unit 22d is provided on the rear side of the right side portion of the vehicle V, and detects an object on a slightly rearward side of the right side area in the vicinity of the vehicle V. The fifth lidar unit 22e is provided on the rear side of the left side portion of the vehicle V, and detects an object on a slightly rearward side of the left side area in the vicinity of the vehicle V. Detection signals of the lidar units 22a-22e are transmitted to the nearby-area recognition device 24.

The radar units 23a-23e are each a millimeter-wave radar that measures reflected waves from objects resulting from millimeter-wave irradiation, so as to detect an object in the vicinity of the vehicle V. The first radar unit 23a is provided on the right edge side of the front portion of the vehicle V when seen in the travel direction, and detects an object on a slightly rightward side of the forward area in the vicinity of the vehicle V. The second radar unit 23b is provided on the left edge side of the front portion of the vehicle V when seen in the travel direction, and detects an object on a slightly leftward side of the forward area in the vicinity of the vehicle V. The third radar unit 23c is provided at the center, in the vehicle width direction, of the front portion of the vehicle V, and detects an object in the forward area in the vicinity of the vehicle V. The fourth radar unit 23d is provided on the right edge side of the rear portion of the vehicle V when seen in the travel direction, and detects an object on a slightly rightward side of the rearward area in the vicinity of the vehicle V. The fifth radar unit 23e is provided on the left edge side of the rear portion of the vehicle V when seen in the travel direction, and detects an object on a slightly leftward side of the rearward area in the vicinity of the vehicle V. Detection signals of the radar units 23a-23e are transmitted to the nearby-area recognition device 24.

The nearby-area recognition device 24 performs sensor fusion processing for detection results provided by, for example, the camera units 21a and 21b, the lidar units 22a-22e, and the radar units 23a-23e, so as to recognize nearby traffic participants and the traffic environment (i.e., obstacle, road, lane, sign, traffic light, etc.) in the vicinity of the vehicle V and acquire movement state information pertaining to the type and movement state (i.e., position, movement direction, movement speed, movement acceleration, relative position relative to the vehicle V, relative speed relative to the vehicle V, etc.) of each nearby traffic participant and traffic environment information pertaining to the traffic environment. In the meantime, in order to allow the image processing control device 6, which is described hereinafter, to identify individual nearby traffic participants, it is preferable that the nearby-area recognition device 24 impart a unique identification number to each of the identified nearby traffic participants and associate the above-described movement state information with the identification numbers. The nearby-area recognition device 24 transmits the acquired movement state information and traffic environment information to, for example, the driver-recognition detection device 4 and the image processing control device 6.

For example, the navigation device 25 includes, for example: a GNSS receiver for identifying the current position of the vehicle V on the basis of a signal received from a GNSS satellite; and a storage device for storing map information. The navigation device 25 transmits, to the image processing control device 6, the current position of the vehicle V, which is obtained using, for example, the GNSS receiver and the storage device, and traffic environment information pertaining to, for example, the type of a nearby road.

The driver-state acquisition device 3 is formed from various devices for acquiring driver state information correlated with the driving ability of the driver who is driving. More specifically, the driver-state acquisition device 3 is formed from, for example: an in-vehicle camera for, for example, detecting the orientation of the line of sight of the driver who is driving and detecting whether the driver's eye is open; a seatbelt sensor provided at the seatbelt worn by the driver so as to detect, for example, the presence/absence of the pulse or breathing of the driver; a steering sensor provided at the steering held by the driver so as to detect the skin potential of the driver; an in-vehicle microphone for detecting the presence/absence of a conversation between the driver and a passenger; a wearable terminal for measuring biometric information pertaining to the driver such as the heart rate, the blood pressure, and the blood oxygen saturation level of the driver; and a smartphone for storing schedule information pertaining to the driver. The driver-state acquisition device 3 transmits the acquired driver state information to the image processing control device 6.

The driver-recognition detection device 4 detects whether the driver has recognized a nearby traffic participant. In particular, for each nearby traffic participant recognized by the vehicle-mounted external-area recognition device 2, the driver-recognition detection device 4 detects whether the driver has visually checked the nearby traffic participant. More specifically, the driver-recognition detection device 4, which includes the above-described in-vehicle camera for imaging the driver's face, identifies the orientation of the line of sight of the driver on the basis of image data pertaining to the driver's face acquired by the in-vehicle camera, and compares the identified orientation of the line of sight with the position of the nearby traffic participant specified on the basis of the movement state information, so as to detect whether the driver has recognized the nearby traffic participant.

The forward display 50 includes a windshield 51 provided forward of the driver, and a head-up display unit 52 for projecting an image onto the windshield 51. The windshield 51 shows an image of an area forward of the vehicle V. In response to a command from the image processing control device 6 described hereinafter, the head-up display unit 52 displays a prescribed image within a forward display region established on the windshield 51 in an overlaid manner.

The rearward display 53 includes an electronic room mirror 54 for showing an image of an area rearward of the vehicle V, a left vehicle-exterior rear-view mirror unit 55 for showing an image of an area left-rearward of the vehicle V, and a right vehicle-exterior rear-view mirror unit 56 for showing an image of an area right-rearward of the vehicle V.

The electronic room mirror 54 is a display having an image display surface on which an image of an area rearward of the vehicle V captured by, for example, the rearward camera unit 21b is shown. The electronic room mirror 54 is provided within the cabin of the vehicle V at a slightly high position with respect to the driver. In response to a command from the image processing control device 6 described hereinafter, the electronic room mirror 54 displays a prescribed image within a rearward display region established on the image display surface in an overlaid manner.

The left vehicle-exterior rear-view mirror unit 55 and the right vehicle-exterior rear-view mirror unit 56 are respectively provided outside at positions on the left and right sides of the vehicle V with respect to the driver. The vehicle-exterior rear-view mirror units 55 and 56 respectively include: mirror surfaces for showing mirror images of areas left-rearward and right-rearward of the vehicle V; and image display devices for displaying, in response to a command from the image processing control device 6 described hereinafter, prescribed images in an overlaid manner within the rearward display regions established on the mirror surfaces.

The image processing control device 6 includes: an alert object recognizer 61 that recognizes, as an alert object, an entity having a high degree of influence on the safe travel of the vehicle V from among traffic participants recognized as nearby traffic participants by the vehicle-mounted external-area recognition device 2; a display object configurator 62 that sets, as a display object or a non-display object, each of one or more traffic participants recognized as alert objects by the alert object recognizer 61; and a display controller 63 that performs, for the forward display 50 and the rearward display 53, highlight image processing for highlighting the presence of one or more traffic participants set as the display object. The following sequentially describes the functions of the alert object recognizer 61, the display controller 63, and the display object configurator 62.

On the basis of movement state information, traffic status information, and driver state information, the alert object recognizer 61 recognizes, as an alert object, an entity having a high degree of influence on the safe travel of the vehicle V from among one or more traffic participants recognized as nearby traffic participants by the vehicle-mounted external-area recognition device 2.

On the basis of movement state information, traffic status information, and driver state information, the alert object recognizer 61 initially calculates a degree of influence on the safe travel of the vehicle V for each traffic participant recognized a nearby traffic participant by the vehicle-mounted external-area recognition device 2. In the present embodiment, the degree of influence on the safe travel of the vehicle V is a possibility with which a traffic participant of interest contacts the vehicle V, or a parameter that increases or decreases according to, for example, the level of damage the vehicle V could be subjected to due to the action of the traffic participant of interest.

More specifically, the alert object recognizer 61 detects or predicts, on the basis of, for example, movement state information, traffic environment information, and driver state information, risky behaviors of the nearby traffic participant of interest that could pose a threat to the safe travel of the vehicle V, and calculates the degree of influence of the nearby traffic participant of interest on the basis of the result of detection or prediction of the risky behaviors. The risky behaviors that could pose a threat to the safe travel of the vehicle V include, for example: a behavior of the nearby traffic participant of interest suddenly approaching the vehicle V; a behavior of the nearby traffic participant of interest suddenly blocking or crossing a scheduled travel path of the vehicle V; a behavior of the nearby traffic participant of interest suddenly reducing the speed on a scheduled travel path of the vehicle V; a behavior of the nearby traffic participant of interest passing the vicinity of the vehicle V at a higher speed than the vehicle V; a behavior of the nearby traffic participant of interest following the vehicle V with a short inter-vehicular distance; and a behavior of the nearby traffic participant of interest insulting the driver of the vehicle V.

The nearby traffic participants could exhibit such risky behaviors due to a change in the nearby traffic environment (e.g., decrease in the number of lanes, presence of a junction). Thus, the alert object recognizer 61 preferably predicts risky behaviors of the nearby traffic participant of interest on the basis of not only movement state information but also traffic environment information.

The influence of such risky behaviors of nearby traffic participants on the safe travel of the vehicle V varies according to the state of the driver of the vehicle V. In particular, if the recognition of a nearby traffic participant by the driver of the vehicle V tends to be delayed, the influence on the safe travel of the vehicle V increases due to the delayed recognition by the driver. Thus, the alert object recognizer 61 preferably calculates the degree of influence of the nearby traffic participant of interest on the basis of not only movement state information and traffic environment information but also driver state information.

The alert object recognizer 61 calculates the degree of influence of each nearby traffic participant in accordance with the above-described procedure, and then compares the calculated degrees of influence with a prescribed degree-of-influence threshold so as to specify a nearby traffic participant to be recognized as an alert object. Thus, the alert object recognizer 61 recognizes, as an alert object, an entity exceeding the degree-of-influence threshold from among one or more nearby traffic participants.

The alert object recognizer 61 may set the degree-of-influence threshold to a fixed value, or may set the degree-of-influence threshold to a variable that is set on an as-needed basis according to traffic environment information and/or driver state information. More specifically, for example, when having determined that the driver of the vehicle V is feeling rushed on the basis of driver state information, the alert object recognizer 61 may set a lower value as the degree-of-influence threshold than when determining that the driver is not feeling rushed. In this way, the alert object recognizer 61 can change the degree-of-influence threshold to a lower value as the degree of rushed feeling of the driver becomes higher, thereby causing the highlight image processing described hereinafter to be performed with a higher frequency, so that the driver can be frequently encouraged to recognize the nearby area. Meanwhile, for example, when having determined that an accident tends to occur in the nearby traffic environment (e.g., an area with a small road width, an area close to a junction of arterial roads) on the basis of traffic environment information, the alert object recognizer 61 may set a lower value as the degree-of-influence threshold than when determining that an accident rarely occurs in the environment. In this way, the alert object recognizer 61 can change the degree-of-influence threshold to a lower value as the likelihood of an accident occurring increases in the traffic environment of the vicinity of the vehicle V, thereby causing the highlight image processing described hereinafter to be performed with a higher frequency, so that the driver can be frequently encouraged to recognize the nearby area.

The alert object recognizer 61 transmits, to the display object configurator 62 and the display controller 63, an alert object recognition count, which corresponds to the number of nearby traffic participants recognized as alert objects, identification numbers unique to the nearby traffic participants recognized as alert objects, and information pertaining to, for example, the degree of influence of the nearby traffic participants recognized as alert objects.

For the forward display 50, which shows an image of an area forward of the vehicle V, and the rearward display 53, which shows an image of an area rearward of the vehicle V and images of areas laterally rearward of the vehicle V, the display controller 63 performs highlight image processing for highlighting, on the forward display 50 and the rearward display 53, the presence of a nearby traffic participant that has been set as a display object through the processing described hereinafter, which is performed by the display object configurator 62.

First, on the basis of movement state information, the display controller 63 calculates the position of a nearby traffic participant set as a display object by the display object configurator 62. On the basis of the calculated position of the display object, the display controller 63 determines whether the display object is present forward of the vehicle V, i.e., whether the display object has been shown on the windshield 51 of the forward display 50. When the display object is present forward of the vehicle V, the display controller 63 performs, for the head-up display unit 52 of the forward display 50, highlight image processing for highlighting the presence of the display object shown on the windshield 51.

Figure 2:
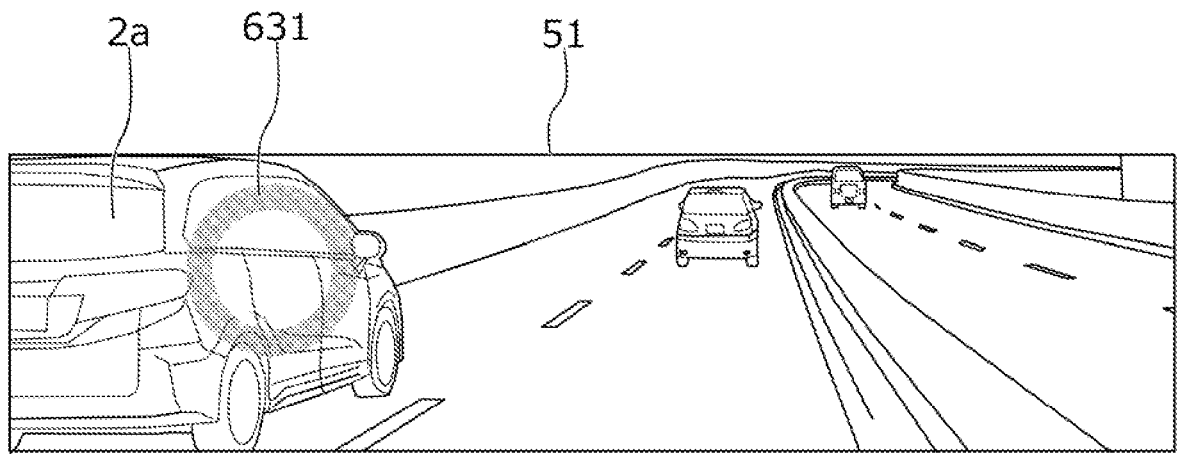
FIG. 2 illustrates an example of highlight image processing for a forward display.

FIG. 2 illustrates an example of the highlight image processing for the forward display 50. Note that FIG. 2 depicts a situation in which a preceding vehicle 2a traveling through an area left-forward of the vehicle V, from among nearby traffic participants for the vehicle V, has been set as a display object. The alert object recognizer 61 has recognized the preceding vehicle 2a as an alert object upon determining that the preceding vehicle 2a could block an area forward of the vehicle V so as to make a lane change.

In the highlight image processing for the forward display 50, the display controller 63 sets, as a forward display region, a portion of the windshield 51 present forward of the driver that is showing the preceding vehicle 2a set as a display object, i.e., with reference to the example of FIG. 2, a portion of the windshield 51 through which the real image of the preceding vehicle 2a can be seen by the driver, and displays a highlight image 631 having a specified feature in an overlaid manner within the forward display region, so as to highlight the presence of the preceding vehicle 2a.

Although FIG. 2 depicts a situation in which the highlight image 631 has an annular shape, the present invention is not limited to this. As long as the highlight image 631 has such a shape as to attract the driver's attention, the highlight image may have a rectangular shape or another geometric shape. Although FIG. 2 depicts a situation in which the highlight image 631 is slightly smaller than the preceding vehicle 2a, the present invention is not limited to this. The size of the highlight image 631 may be increased to the extent that the driver's view is not hindered, or may be varied according to the size of an image of a display object to be shown. Although FIG. 2 depicts a situation in which the highlight image 631, which has permeability, is displayed on the preceding vehicle 2a in an overlaid manner, the present invention is not limited to this. As long as the highlight image has such a shape as not to hinder the driver's view, the highlight image does not need to have permeability. The highlight image 631 preferably has a different color from the preceding vehicle 2a and the background of the nearby area so as to attract the driver's attention (e.g., green, yellow, red). The display controller 63 may cause the highlight image 631 to blink on a prescribed cycle as necessary.

Referring to FIG. 1 again, when the display object is not present forward of the vehicle V, the display controller 63 determines, on the basis of the calculated position of the display object, whether the display object is present outside the blind area reward of the vehicle V and the blind areas laterally rearward thereof, i.e., whether the display object has been shown on any of the image display surface of the electronic room mirror 54 and the mirror surfaces of the vehicle-exterior rear-view mirror units 55 and 56 of the rearward display 53. When the display object is present outside the blind area reward of the vehicle V and the blind areas laterally rearward thereof, the display controller 63 performs, for any of the electronic room mirror 54 and the vehicle-exterior rear-view mirror units 55 and 56 of the rearward display 53, highlight image processing for highlighting the presence of the display object shown on the image display surface or the mirror surface.

Figure 3:
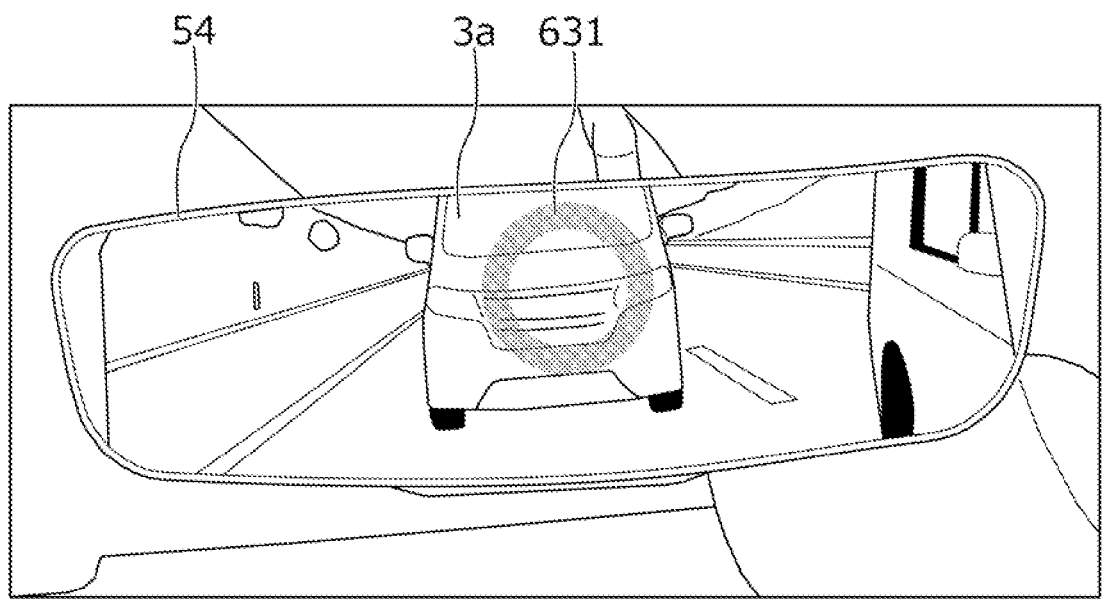
FIG. 3 illustrates an example of highlight image processing for an electronic room mirror of a rearward display.

FIG. 3 illustrates an example of the highlight image processing for the electronic room mirror 54 of the rearward display 53. Note that FIG. 3 depicts a situation in which a following vehicle 3*a* traveling through an area rearward of the vehicle V, from among nearby traffic participants for the vehicle V, has been set as a display object. The alert object recognizer 61 has recognized the following vehicle 3*a* as an alert object due to the following vehicle 3*a* following the vehicle V with an extremely short inter-vehicular distance.

In the highlight image processing for the rearward display 53, the display controller 63 sets, as a rearward display region, a portion of the image display surface of the electronic room mirror 54 and the mirror surfaces of the vehicle-exterior rear-view mirror units 55 and 56 that is showing the following vehicle 3*a* set as a display object, i.e., with reference to the example of FIG. 3, a portion of the image display surface of the electronic room mirror 54 at which an image of the following vehicle 3*a* can be seen by the driver, and displays a highlight image 631, which has a feature such as that describe above, in an overlaid manner within the rearward display region, so as to highlight the presence of the following vehicle 3*a*.

In accordance with such a procedure, the display controller 63 performs, for the forward display 50 and the rearward display 53, the highlight image processing for highlighting the presence of a nearby traffic participant set as a display object. Meanwhile, when a nearby traffic participant that has been set as a display object up to that time is set as a non-display object while remaining recognized as an alert object, i.e., when the setting of the nearby traffic participant as a display object has been released, the display controller 63 ends the highlight image processing performed up to that time. When a nearby traffic participant that has been set as a display object up to that time is no longer recognized as an alert object by the alert object recognizer 61, the display controller 63 also ends the highlight image processing performed up to that time. When ending the highlight image processing in such a manner, the display controller 63 may immediately delete a highlight image 631 displayed up to that time on the forward display 50 or the rearward display 53, or may perform, over a prescribed period of time, grayout image processing for gradually making the presence of the highlight image 631 unnoticeable by gradually changing the feature (i.e., shape, size, permeation rate, color, and the like) of the highlight image 631.

The display object configurator 62 sets, as a display object or a non-display object, each of one or more nearby traffic participants recognized as alert objects by the alert object recognizer 61 described above. When the display object configurator 62 has set, as a display object, a nearby traffic participant recognized as an alert object, the display controller 63 performs, as described above, the highlight image processing for the nearby traffic participant set as a display object. When the display object configurator 62 has set a nearby traffic participant as a non-display object, even if this nearby traffic participant has been recognized as an alert object, the highlight image processing for this nearby traffic participant is not performed.

Accordingly, the upper limit (hereinafter may also be referred to as the "display-object-setting-count upper limit") of the number of nearby traffic participants that the display object configurator 62 currently sets as display objects is equal to the number of operations of the highlight image processing concurrently performed by the display controller 63, i.e., the number of highlight images 631 displayed on the forward display 50 and the rearward display 53. In the following, descriptions are given of situations in which the display-object-setting-count upper limit is set to "1" in order to prevent the driver from being confused as much as possible. In particular, the following describes situations in which the display object configurator 62 sets, as a display object, only one entity from among a plurality of nearby traffic participants recognized as alert objects, and sets all of the remaining entities as non-display objects. However, the present invention is not limited to this. The display-object-setting-count upper limit may be greater than "1" to the extent that the driver is not confused.

Figure 4:
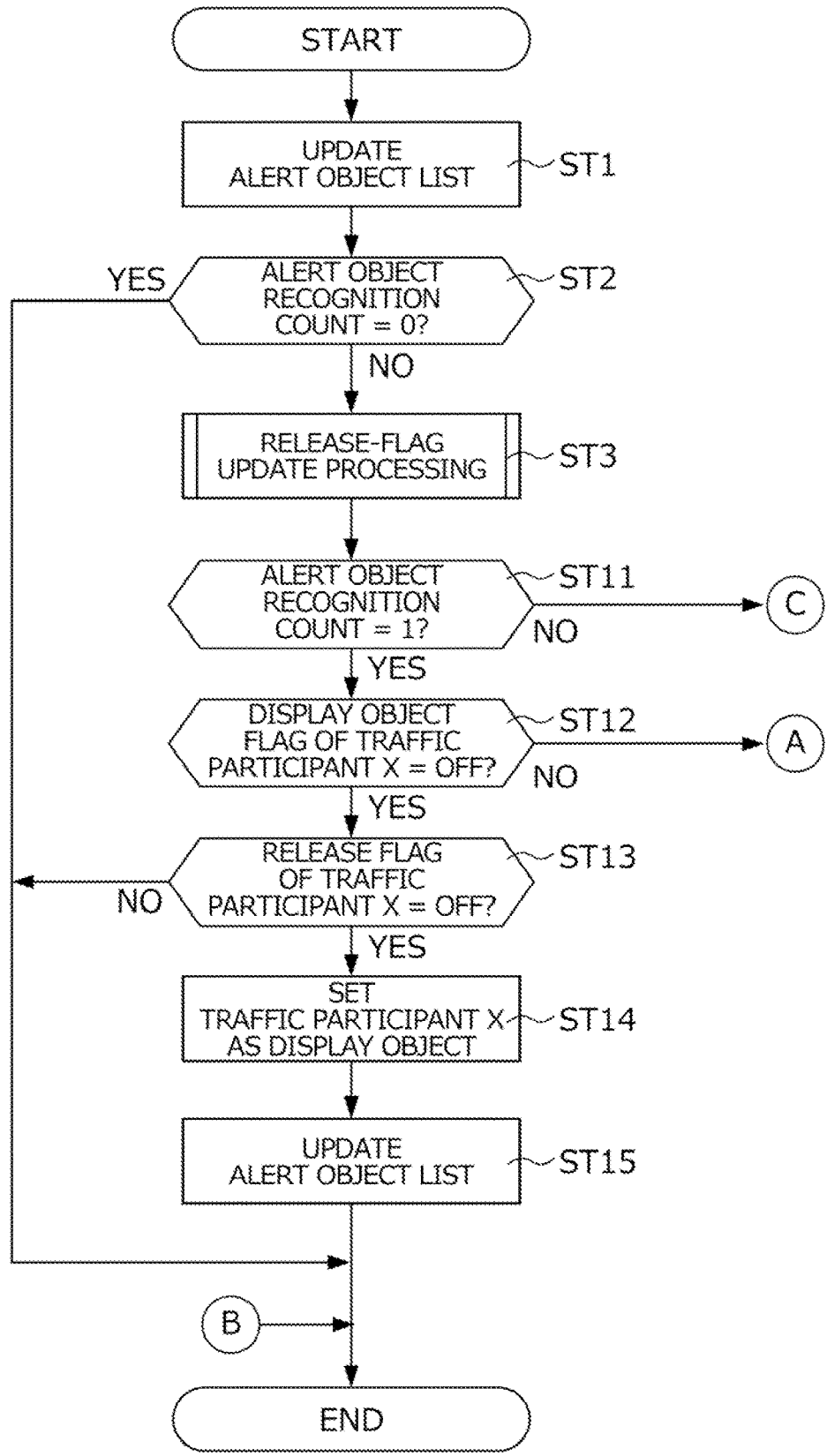
FIG. 4 is a flowchart illustrating a specific procedure of display/non-display setting processing by a display object configurator (example 1)
Figure 5:
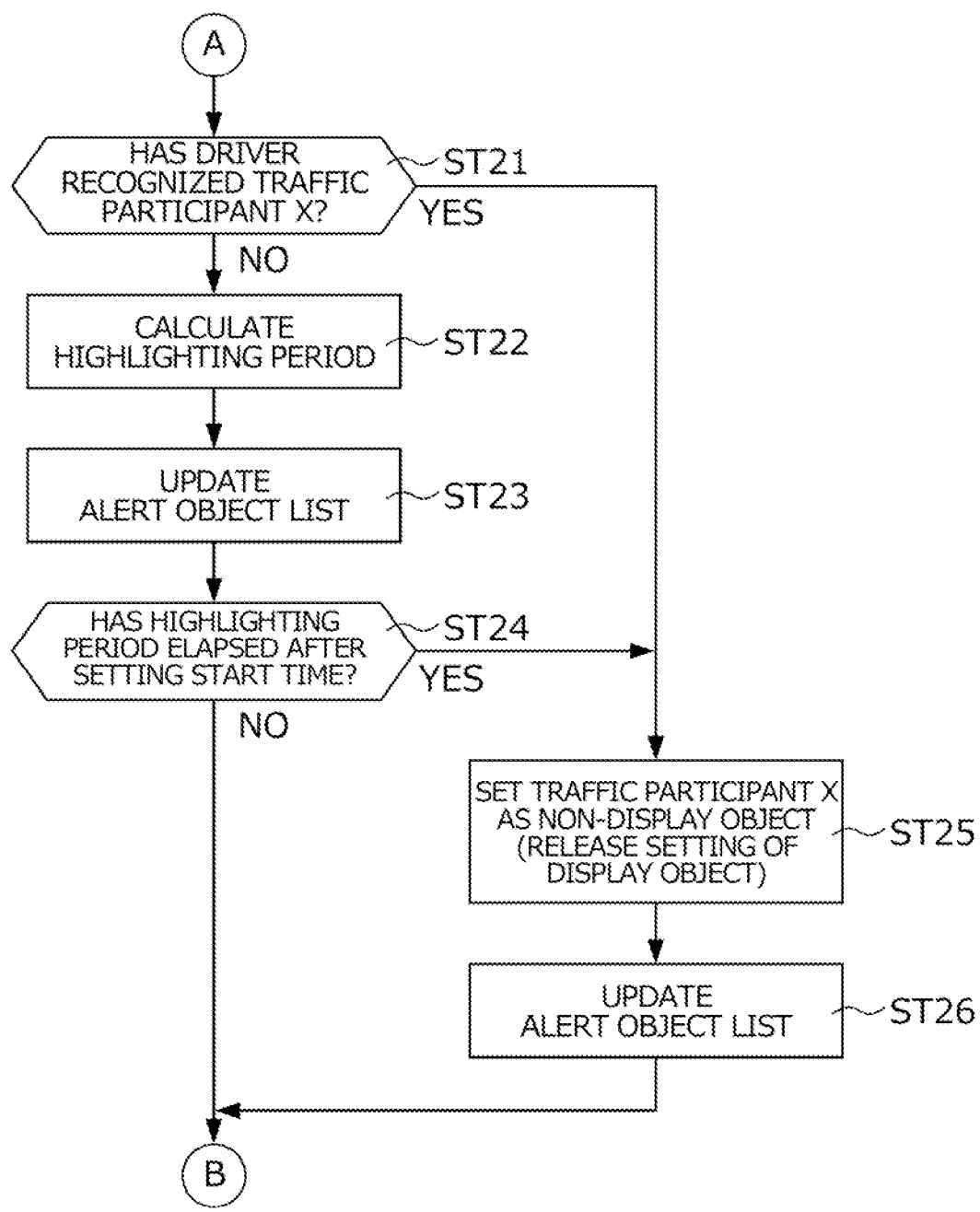
FIG. 5 is a flowchart illustrating a specific procedure of display/non-display setting processing by the display object configurator (example 2)

FIGS. 4 and 5 are flowcharts illustrating a specific procedure of display/non-display setting processing by the display object configurator 62. The display/non-display setting processing is for setting, as a display object or a non-display object, a nearby traffic participant recognized as an alert object and is repeatedly performed on a prescribed control cycle by the display object configurator 62. The operation performed by the display object configurator 62 of setting, as a non-display object, a nearby traffic participant that has been set as a display object up to that time may hereinafter be also referred to as releasing the setting of a display object.

First, in step ST1, the display object configurator 62 updates a prescribed alert object list on the basis of information transmitted from the alert object recognizer 61 and shifts to step ST2.

FIG. 8 illustrates an example of an alert object list stored in a storage region of the display object configurator 62. As depicted in FIG. 8, the alert object list has recorded therein an alert object recognition count for the current control cycle as well as various information associated with identification numbers unique to individual nearby traffic participants recognized as alert objects by the alert object recognizer 61 in the current control cycle.

The fields of "IDENTIFICATION NUMBER OF NEARBY TRAFFIC PARTICIPANT" in the alert object list in FIG. 8 have recorded therein the identification numbers of individual nearby traffic participants recognized as alert objects by the alert object recognizer 61 in the current control cycle.

The fields of "RECOGNITION TIME" in the alert object list in FIG. 8 have recorded therein a time at which a nearby traffic participant of interest (i.e., a nearby traffic participant associated with an identification number; this is also true in the following description) was recognized as an alert object by the alert object recognizer 61.

The fields of "DEGREE OF INFLUENCE (LATEST)" in the alert object list in FIG. 8 have recorded therein the latest value of the degree of influence of a nearby traffic participant of interest (i.e., the value of a degree of influence calculated by the alert object recognizer 61 in the current control cycle). Although the present embodiment is described by referring to situations in which the degree of influence of each nearby traffic participant is calculated in each control cycle by the alert object recognizer 61, the present invention is not limited to this. The degree of influence of each nearby traffic participant recognized as an alert object by the alert object recognizer 61 may be calculated in each control cycle by the display object configurator 62 using the same procedure as the described alert object recognizer 61.

The fields of "DISPLAY OBJECT FLAG" in the alert object list in FIG. 8 have recorded therein the status of a display object flag designated for each nearby traffic participant of interest. The display object flag demonstrates that the display object configurator 62 has set a nearby traffic participant of interest as a display object, and is initially set as "OFF" after the nearby traffic participant is recognized as an alert object by the alert object recognizer 61. As described hereinafter, when setting, as a display object, a nearby traffic participant recognized as an alert object, the display object configurator 62 sets "ON" as the status of a display object flag associated with the nearby traffic participant. When setting, as a non-display object, a nearby traffic participant recognized as an alert object, the display object configurator 62 sets "OFF" as the status of a display object flag associated with the nearby traffic participant.

The fields of "SETTING START TIME" in the alert object list in FIG. 8 have recorded therein a time at which the display object configurator 62 set a nearby traffic participant of interest as a display object. As described hereinafter, the display object configurator 62 sets, as a setting start time, a time at which the display object configurator 62 set, as a display object, a nearby traffic participant recognized as an alert object.

The fields of "HIGHLIGHTING PERIOD" in the alert object list in FIG. 8 have recorded therein a highlighting period corresponding to the longest period during which a nearby traffic participant of interest would continue to be set as a display object. As described hereinafter, the display object configurator 62 sets a highlighting period in each control cycle on the basis of the latest degree of influence.

The fields of "RELEASE FLAG" in the alert object list in FIG. 8 have recorded therein the status of a release flag designated for each nearby traffic participant of interest. The release flag demonstrates that the driver has recognized a nearby traffic participant of interest, and is initially set as "OFF" after the alert object recognizer 61 recognizes the nearby traffic participant as an alert object. As described hereinafter, when having released the setting of a nearby traffic participant as a display object, the display object configurator 62 changes the release flag from "OFF" to "ON." As described hereinafter, after setting "ON" as the release flag, when a prescribed condition is satisfied, the display object configurator 62 resets the release flag so as to change the same from "ON" to "OFF." As described hereinafter, the display object configurator 62 does not set, as a display object, a nearby traffic participant for which "ON" has been set as the status of the release flag.

The fields of "DEGREE OF INFLUENCE (DURING RELEASED SETTING)" in the alert object list in FIG. 8 have recorded therein the value of a degree of influence at a time point at which the setting of a nearby traffic participant of interest as a display object was released. As described hereinafter, the display object configurator 62 stores, in the alert object list, the value of a degree of influence obtained at a time when the same changes the release flag from "OFF" to "ON."

Referring to FIG. 4 again, in step ST1, the display object configurator 62 updates the alert object list on the basis of information transmitted from the alert object recognizer 61 and shifts to step ST2. More specifically, the display object configurator 62 updates a field of the "DEGREE OF INFLU-ENCE (LATEST)" in the alert object list with the latest value. When the alert object recognizer 61 has recognized a new nearby traffic participant as an alert object, the display object configurator 62 adds information, such as the identification number of the new nearby traffic participant and the value of the latest degree of influence, to the alert object list, and adds one to the alert object recognition count. Meanwhile, when adding information on a new nearby traffic participant to the alert object list, the display object configurator 62 sets "OFF" as the statuses of both the display object flag and the release flag. When a nearby traffic participant that has been recognized as an alert object by the alert object recognizer 61 up to that time is no longer recognized as an alert object by the alert object recognizer 61, the display object configurator 62 deletes, from the alert object list, all the information pertaining to the nearby traffic participant that is no longer recognized as an alert object, and subtracts one from the alert object recognition count.

Next, in step ST2, the display object configurator 62 refers to the alert object list so as to determine whether the alert object recognition count is 0. When the determination result of step ST2 is YES, i.e., when the alert object recognition count is 0, the display object configurator 62 ends the display/non-display setting processing without performing the processing described hereinafter. When the determination result of step ST2 is NO, i.e., when the alert object recognition count is higher than 0, the display object configurator 62 shifts to step ST3.

In step ST3, the display object configurator 62 performs release-flag update processing and shifts to ST11. The release-flag update processing is for updating the status of the release flag defined in the alert object list, and details thereof are described hereinafter by referring to FIG. 9.

In step ST11, the display object configurator 62 refers to the alert object list so as to determine whether the alert object recognition count is equal to "1," which is the display-object-setting-count upper limit. When the determination result of step ST11 is YES, i.e., when the alert object recognition count is "1," the display object configurator 62 shifts to step ST12. When only one nearby traffic participant has been recognized as an alert object, the display object configurator 62 performs the processes of steps ST12-ST26 described hereinafter. In the following descriptions of the processes of steps ST12-ST26, a nearby traffic participant recognized as an alert object is referred to as a "traffic participant X" in order to facilitate understanding.

First, in step ST12, the display object configurator 62 refers to the alert object list so as to determine whether the status of the display object flag for the traffic participant X is "OFF." In step ST12, in particular, the display object configurator 62 determines whether the traffic participant X was unset as a display object in the previous control cycle, i.e., whether the highlight image processing for the traffic participant X was unperformed in the previous control cycle. When the determination result of step ST12 is YES, the display object configurator 62 shifts to step ST13.

In step ST13, the display object configurator 62 refers to the alert object list so as to determine whether the status of the release flag for the traffic participant X is "OFF." When the determination result of step ST13 is YES, the display object configurator 62 shifts to step ST14.

In step ST14, the display object configurator 62 sets the traffic participant X as a display object and shifts to step ST15. In response to the display object configurator 62 setting the traffic participant X as a display object in such a manner, the display controller 63 starts the highlight image processing for the traffic participant X. In step ST15, the alert object list is updated, and the display/non-display setting processing ends. More specifically, in accordance with newly setting the traffic participant X as a display object in step ST14, the display object configurator 62 changes the status of the display object flag for the traffic participant X in the alert object list from "OFF" to "ON," and records the current time in the field of "SETTING START TIME" for the traffic participant X in the alert object list.

As described above, after the alert object recognizer 61 has recognized the traffic participant X as an alert object, "OFF" is initially set as the status of the release flag for the traffic participant X. Thus, with respect to a situation in which only one entity (i.e., traffic participant X) is recognized as an alert object by the alert object recognizer 61, as soon as the alert object recognizer 61 recognizes the traffic participant X as an alert object, the display object configurator 62 sets the traffic participant X as a display object, and causes the highlight image processing for the traffic participant X to start.

When the determination result of step ST13 is NO, i.e., when the status of the release flag for the traffic participant X is "ON," the display object configurator 62 ends the display/non-display setting processing with the traffic participant X remaining in the non-display setting. Accordingly, the display object configurator 62 does not set, as a display object, a nearby traffic participant for which "ON" has been set as the status of the release flag.

When the determination result of step ST12 is NO, i.e., when the traffic participant X is found to have already been set as a display object in the previous control cycle, the display object configurator 62 shifts to step ST21 (see FIG. 5).

In step ST21, the display object configurator 62 refers to the alert object list and a detection result provided by the driver-recognition detection device 4 so as to determine whether the driver of the vehicle V has recognized the traffic participant X, which has been set as a display object, within the period from the corresponding setting start time to the current time. When the determination result of step ST21 is NO, the display object configurator 62 shifts to step ST22.

In step ST22, the display object configurator 62 refers to the alert object list so as to obtain the latest degree of influence of the traffic participant X set as a display object, calculates a highlighting period for the traffic participant X on the basis of the obtained degree of influence, and shifts to step ST23. In step ST22, it is preferable that, the higher degree of influence the traffic participant X has, the longer highlighting period the display object configurator 62 calculate. In step ST23, the display object configurator 62 updates the alert object list and shifts to step ST24. More specifically, in accordance with newly calculating the highlighting period for the traffic participant X in step ST22, the display object configurator 62 records the newly calculated highlighting period in the field of "HIGHLIGHTING PERIOD" for the traffic participant X in the alert object list.

In step ST24, the display object configurator 62 refers to the alert object list so as to determine whether the highlighting period has elapsed within the period from the setting start time of the traffic participant X to the current time. When the determination result of step ST24 is NO, the display object configurator 62 ends the display/non-display setting processing with the setting of the traffic participant X as a display object being maintained. In particular, when the determination result of step ST24 is NO, the display object configurator 62 ends the display/non-display setting processing with "ON" being maintained as the status of the display object flag for the traffic participant X in the alert object list.

The display object configurator 62 shifts to step ST25 when the determination result of step ST21 is YES or when the determination result of step ST24 is YES, i.e., when the traffic participant X is set as a display object and then the highlighting period for the traffic participant X has elapsed or the recognition of the traffic participant X by the driver has been detected.

In step ST25, the display object configurator 62 sets, as a non-display object, the traffic participant X, which has been set as a display object up to that time, and shifts to step ST26. In other words, the display object configurator 62 releases the setting of the traffic participant X as a display object and shifts to step ST26. In response to the display object configurator 62 releasing the setting of the traffic participant X as a display object in such a manner, the display controller 63 ends the highlight image processing for the traffic participant X. In step ST26, the display object configurator 62 updates the alert object list and ends the display/non-display setting processing. More specifically, in accordance with releasing the setting of the traffic participant X as a display object in step ST25, the display object configurator 62 changes the status of the display object flag for the traffic participant X in the alert object list from "ON" to "OFF," changes the status of the release flag from "OFF" to "ON," and records the latest degree of influence in the field of "DEGREE OF INFLUENCE (DURING RELEASED SETTING)."

As described above, upon releasing the setting of a nearby traffic participant as a display object, the display object configurator 62 changes the status of the release flag for the nearby traffic participant from "OFF" to "ON." As described above, meanwhile, the display object configurator 62 does not set, as a display object, a nearby traffic participant for which "ON" has been set as the status of the release flag (see the above-described step T13). Accordingly, the display object configurator 62 does not set the nearby traffic participant as a display object again, as long as the release flag is reset and thus changed from "ON" to "OFF" through the release-flag update processing, which is described hereinafter by referring to FIG. 9.

Figure 9:
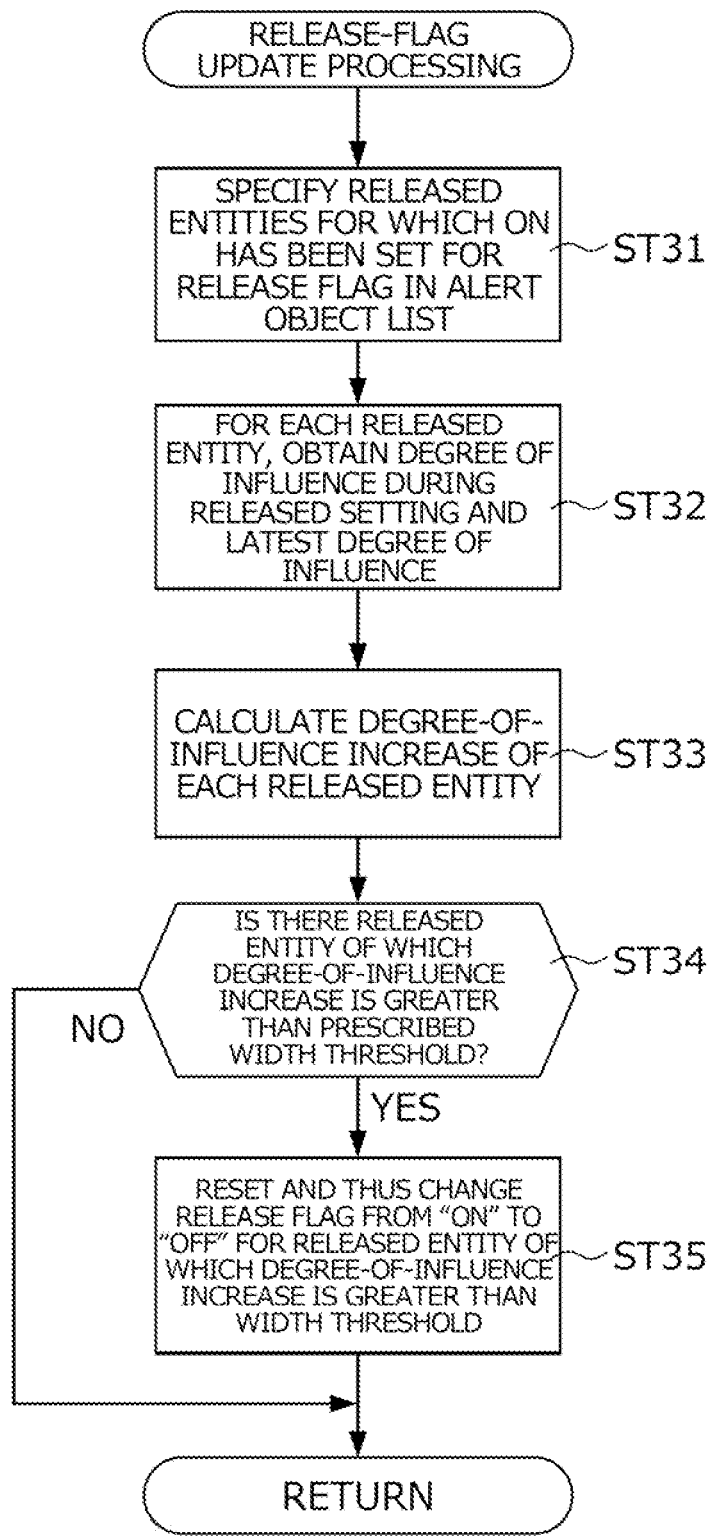
FIG. 9 is a flowchart illustrating a specific procedure of release-flag update processing.

FIG. 9 is a flowchart illustrating a specific procedure of the release-flag update processing. In step ST31, first, the display object configurator 62 refers to the alert object list so as to specify all of one or more nearby traffic participants for which "ON" has been set as the status of the release flag, and shifts to step ST32. Note that nearby traffic participants for which "ON" has been set as the status of the release flag from among the nearby traffic participants in the alert object list may each be hereinafter referred to as a "released entity."

In step ST32, the display object configurator 62 refers to the alert object list so as to obtain, for each released entity, the degree of influence during released setting and the latest degree of influence, and shifts to step ST33.

In step ST33, the display object configurator 62 refers to the alert object list so as to calculate, for each released entity, a degree-of-influence increase, and shifts to step ST34. More specifically, the display object configurator 62 subtracts the degree of influence during released setting from the latest degree of influence obtained in step ST32, so as to calculate the degree-of-influence increase of each released entity (degree-of-influence increase=latest degree of influence–degree of influence during released setting).

In step ST34, the display object configurator 62 determines whether one or more released entities specified in step ST31 include an entity having a degree-of-influence increase that is greater than a width threshold, which is a prescribed positive value. When the determination result of step ST34 is NO, the display object configurator 62 shifts to step ST11 (see FIG. 4) without updating the alert object list. When the determination result of step ST34 is YES, the display object configurator 62 shifts to step ST35.

In step ST35, the display object configurator 62 updates the alert object list and shifts to step ST11. More specifically, the display object configurator 62 resets and thus changes the status of the release flag from "ON" to "OFF" for a released entity in the alert object list that has a degree-of-influence increase that is greater than the width threshold.

Next, descriptions are given of the above-described function of the release flag by referring to a situation in which the alert object recognizer 61 has recognized a certain traffic participant Y as an alert object.

In this situation, upon the traffic participant Y being recognized as an alert object, the display object configurator 62 sets the traffic participant Y as a display object (see step ST14), thereby causing the highlight image processing for the traffic participant Y to be performed. Afterward, when the recognition, by the driver, of the traffic participant Y set as a display object has been detected (see step ST21) or when the highlighting period has elapsed since the setting start time (see step ST24), the display object configurator 62 sets the traffic participant Y as a non-display object (see step ST25) and resets and thus changes the status of the release flag for the traffic participant Y from "OFF" to "ON" (see step ST26). Note that, as long as "ON" is set as the status of the release flag, the display object configurator 62 does not set the traffic participant Y as a display object again (see step ST13). Afterward, when the degree of influence of the traffic participant Y for which "ON" is set as the status of the release flag has increased by an amount equal to or greater than the prescribed width threshold after the time point at which the traffic participant Y was set as a non-display object or the time point at which the recognition of the traffic participant Y by the driver was detected (see step ST34), the display object configurator 62 resets and thus changes the status of the release flag for the traffic participant Y from "ON" to "OFF" (see step ST35). As a result, the traffic participant Y is permitted to be set as a display object. Accordingly, as long as no traffic participants other than the traffic participant Y have been recognized as an alert object at the time point at which the status of the release flag for the traffic participant Y is reset and thus changed from "ON" to "OFF," the display object configurator 62 immediately sets the traffic participant Y as a display object again (see step ST13), and the highlight image processing for the traffic participant Y is performed again.

Figure 6:
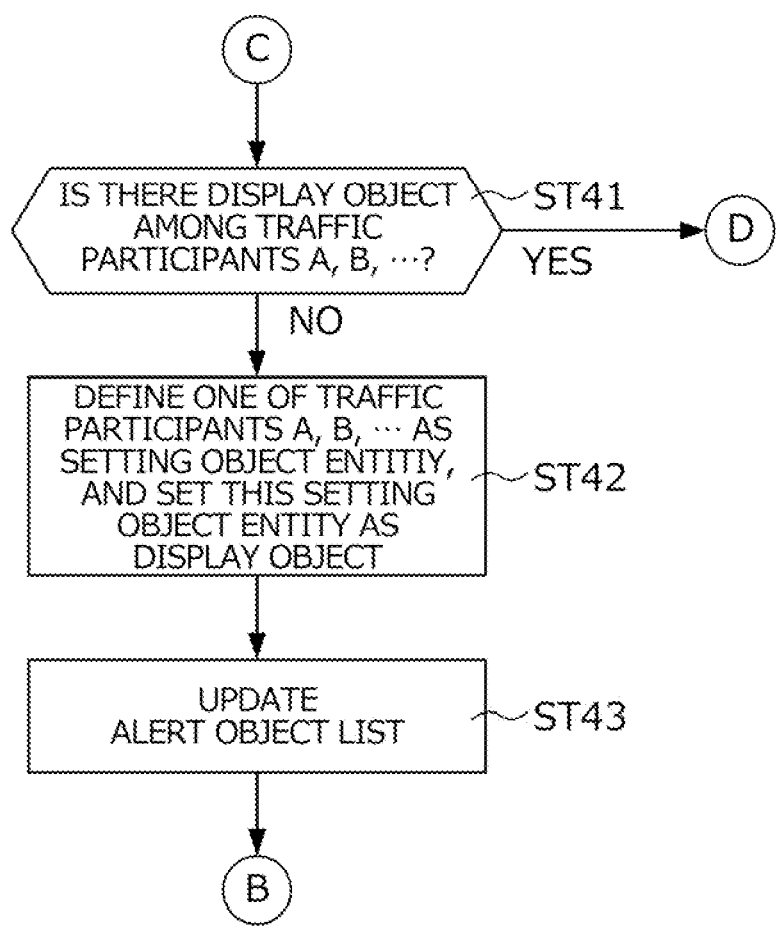
FIG. 6 is a flowchart illustrating a specific procedure of display/non-display setting processing by the display object configurator (example 3)

When the determination result of step ST11 is NO, i.e., when the alert object recognition count is "2" or higher, the display object configurator 62 shifts to step ST41 (see FIG. 6). When two or more nearby traffic participants have been recognized as alert objects, the display object configurator 62 performs the processes of steps ST41-ST63 (see FIGS. 6 and 7) described hereinafter. In the following descriptions of the processes of steps ST41-ST63, accordingly, nearby traffic participants recognized as alert objects, i.e., the nearby traffic participants described in the alert object list, are referred to as "traffic participants A, B, . . . " in order to facilitate understanding.

First, in step ST41, the display object configurator 62 refers to the alert object list so as to determine whether the plurality of traffic participants A, B, . . . include an entity set as a display object. In other words, the display object configurator 62 determines whether the plurality of traffic participants A, B, . . . include an entity for which "ON" has been set as the status of the display object flag in the alert object list. When the determination result of step ST41 is NO, the display object configurator 62 shifts to step ST42.

In step ST42, the display object configurator 62 refers to the alert object list and sets, as a display object, one entity that has been designated in accordance with the following procedure from among the plurality of traffic participants A, B, . . . , and shifts to step ST43. More specifically, the display object configurator 62 first refers to the alert object list so as to extract, as candidates, only entities for which "OFF" has been set as the status of the release flag from among the plurality of traffic participants A, B, . . . . Thus, the display object configurator 62 excludes, from the candidates, entities for which "ON" has been set as the status of the release flag from among the plurality of traffic participants A, B, . . . . Next, the display object configurator 62 determines, as a setting object entity, an entity of which the latest degree of influence is the highest among the one or more extracted candidates. The display object configurator 62 also sets the determined setting object entity as a display object. In response to the display object configurator 62 setting the setting object entity as a display object in such a manner, the display controller 63 starts the highlight image processing for the setting object entity. In step ST43, the display object configurator 62 updates the alert object list and ends the display/non-display setting processing. More specifically, in accordance with newly setting the setting object entity as a display object in step ST42, the display object configurator 62 changes the status of the display object flag for the setting object entity in the alert object list from "OFF" to "ON," and records the current time in the field of "SETTING START TIME" for the setting object entity in the alert object list.

When the determination result of step ST41 is YES, i.e., when the plurality of traffic participants A, B, . . . include an entity that has already been set as a display object (i.e., when the highlight image processing is being performed), the display object configurator 62 shifts to step ST51 (see FIG. 7). In the following descriptions of steps ST51-ST63, an entity that has already been set as a display object from among the plurality of traffic participants A, B, . . . may be referred to as a "displayed-setting entity," and the entities other than the displayed-setting entity may be referred to as "non-displayed-setting entities."

In step ST51, the display object configurator 62 refers to the alert object list and a detection result provided by the driver-recognition detection device 4 so as to determine whether the driver of the vehicle V has recognized the displayed-setting entity, which has been set as a display object, within the period from the corresponding setting start time to the current time. When the determination result of step ST51 is NO, the display object configurator 62 shifts to step ST52.

In step ST52, the display object configurator 62 refers to the alert object list so as to obtain the latest degree of influence of the displayed-setting entity set as a display object, calculates a highlighting period for the displayed-setting entity on the basis of the obtained degree of influence, and shifts to step ST53. In step ST52, it is preferable that, the higher degree of influence the setting object entity has, the longer highlighting period the display object configurator 62 calculate, as in the above-described process of step ST22. In step ST53, the display object configurator 62 updates the alert object list and shifts to step ST54. More specifically, in accordance with newly calculating the highlighting period for the displayed-setting entity in step ST52, the display object configurator 62 records the newly calculated highlighting period in the field of "HIGHLIGHTING PERIOD" for the displayed-setting entity in the alert object list.

In step ST54, the display object configurator 62 refers to the alert object list so as to determine whether the highlighting period has elapsed within the period from the setting start time of the displayed-setting entity to the current time. When the determination result of step ST54 is NO, the display object configurator 62 ends the display/non-display setting processing with the setting of the displayed-setting entity as a display object being maintained. In particular, when the determination result of step ST54 is NO, the display object configurator 62 ends the display/non-display setting processing with "ON" being maintained as the status of the display object flag for the displayed-setting entity in the alert object list.

The display object configurator 62 shifts to step ST55 when the determination result of step ST51 is YES or when the determination result of step ST54 is YES, i.e., when the displayed-setting entity is set as a display object and then the highlighting period for the displayed-setting entity has elapsed or the recognition of the displayed-setting entity by the driver has been detected.

In step ST55, the display object configurator 62 refers to the alert object list and extracts, as a switching candidate, one entity designated in accordance with the following procedure from among the one or more non-displayed-setting entities, and shifts to step ST56. More specifically, the display object configurator 62 extracts only entities for which "OFF" has been set as the status of the release flag from among the one or more non-displayed-setting entities. The display object configurator 62 also specifies an entity of which the latest degree of influence is the highest among the extracted zero or one or more non-displayed-setting entities, and defines the specified entity as a switching candidate.

In step ST56, the display object configurator 62 determines whether a switching candidate was extracted in step ST55. In particular, no switching candidates are extracted when "ON" has been set as the status of the release flags for all the non-displayed-setting entities. When the determination result of step ST56 is YES, the display object configurator 62 shifts to step ST57. When the determination result is NO, the display object configurator 62 shifts to step ST62.

In step ST57, the display object configurator 62 refers to the alert object list so as to obtain the latest degrees of influence of the displayed-setting entity (i.e., nearby traffic participant currently set as a display object) and the switching candidate extracted in step ST55, and compares these latest degrees of influence. As described hereinafter, the display object configurator 62 compares the latest degrees of influence of the displayed-setting entity and the switching candidate, sets, as a display object, one designated on the basis of the result of comparison from among the displayed-setting entity and the switching candidate, and sets the other as a non-display object. In step ST57, more specifically, the display object configurator 62 determines whether the latest degree of influence of the displayed-setting entity is higher than the latest degree of influence of the switching candidate. When the determination result of step ST57 is NO, the display object configurator 62 shifts to step ST58. When the determination result of step ST57 is YES, the display object configurator 62 shifts to step ST60.

In step ST58, the display object configurator 62 sets the displayed-setting entity as a non-display object, sets the switching candidate as a display object, and shifts to step ST59. In particular, when the degree of influence of the displayed-setting entity is lower than the degree of influence of the switching candidate or when the degree of influence of the displayed-setting entity is equal to the degree of influence of the switching candidate, the display object configurator 62 sets the displayed-setting entity as a non-display object, sets the switching candidate as a display object, and shifts to step ST59. In response to the display object configurator 62 releasing the setting of the displayed-setting entity as a display object in such a manner, the display controller 63 ends the highlight image processing for the displayed-setting entity. Meanwhile, in response to the display object configurator 62 setting the switching candidate as a display object, the display controller 63 starts the highlight image processing for the switching candidate. In step ST59, the display object configurator 62 updates the alert object list and ends the display/non-display setting processing. More specifically, in accordance with releasing the setting of the displayed-setting entity as a display object in step ST58, the display object configurator 62 changes the status of the display object flag for the displayed-setting entity in the alert object list from "ON" to "OFF," changes the status of the release flag from "OFF" to "ON," and records the latest degree of influence in the field of "DEGREE OF INFLUENCE (DURING RELEASED SETTING)." Meanwhile, in accordance with setting the switching candidate as a display object in step ST58, the display object configurator 62 changes the status of the display object flag for the switching candidate in the alert object list from "OFF" to "ON," and records the current time in the field of "SETTING START TIME" for the switching candidate in the alert object list.

In step ST60, the display object configurator 62 continuously sets the displayed-setting entity as a display object, continuously sets the switching candidate as a non-display object, and ends the display/non-display setting processing. In particular, when the degree of influence of the displayed-setting entity is higher than the degree of influence of the switching candidate, the display object configurator 62 continuously sets the displayed-setting entity as a display object, continuously sets the switching candidate as a non-display object, and ends the display/non-display setting processing. In this case, the display object configurator 62 may update, with the current time, the setting start time of the displayed-setting entity continuously set as a display object in the alert object list.

In step ST62, the display object configurator 62 sets the displayed-setting entity as a non-display object and shifts to step ST63. In response to the display object configurator 62 releasing the setting of the displayed-setting entity as a display object in such a manner, the display controller 63 ends the highlight image processing for the displayed-setting entity. In step ST63, the display controller 63 updates the alert object list and ends the display/non-display setting processing. More specifically, in accordance with releasing the setting of the displayed-setting entity as a display object in step ST62, the display object configurator 62 changes the status of the display object flag for the displayed-setting entity in the alert object list from "ON" to "OFF," changes the status of the release flag from "OFF" to "ON," and records the latest degree of influence in the field of "DEGREE OF INFLUENCE (DURING RELEASED SETTING)."

The drive assistance system 1 according to the present embodiment exhibits the following advantage.

(1) The vehicle-mounted external-area recognition device 2 recognizes traffic participants in the vicinity of a vehicle V as nearby traffic participants; the alert object recognizer 61 recognizes, as an alert object, an entity having a high degree of influence on the safe travel of the vehicle V from among the traffic participants recognized as nearby traffic participants; the display object configurator 62 sets, as a display object or a non-display object, each of the traffic participants recognized as alert objects; and the display controller 63 performs, for the forward display 50 or the rearward display 53 capable of being viewed by the driver, highlight image processing for highlighting the presence of the traffic participant set as a display object. Accordingly, when an alert object having a high degree of influence on the safe travel of the vehicle V is present in the vicinity of the vehicle V and set as a display object, the drive assistance system 1 performs the highlight image processing to highlight the presence of the alert object (display object) on the display 50 or 53, so that the driver can easily recognize the presence of the alert object.

The following describes the advantage of the drive assistance system 1 for a situation in which two entities, namely a first traffic participant and a second traffic participant, are present in the vicinity of the vehicle V. More specifically, descriptions are given of a situation in which the alert object recognizer 61 first recognizes the first traffic participant as an alert object and then recognizes the second traffic participant as an alert object.

In response to the alert object recognizer 61 first recognizing the first traffic participant as an alert object, the display object configurator 62 sets the first traffic participant as a display object (see, for example, step ST14 in FIG. 4). Thus, the display controller 63 starts the highlight image processing for highlighting the presence of the first traffic participant (see, for example, FIG. 2). Afterward, upon, for example, the second traffic participant rapidly approaching the vehicle V, the alert object recognizer 61 recognizes the second traffic participant as an alert object. In this case, at the time point at which the second traffic participant is recognized as an alert object, the display object configurator 62 has set the first traffic participant as a display object and has been performing the highlight image processing for the first traffic participant, thereby setting the second traffic participant as a non-display object.

In such a situation, when the first traffic participant set as a display object and the second traffic participant set as a non-display object are present in the vicinity of the vehicle V and recognized as alert objects with the recognition of the first traffic participant by the driver being detected while the highlight image processing for the first traffic participant is performed (see step ST51 in FIG. 7), the display object configurator 62 compares the degrees of influence of the first and second traffic participants, sets, as a display object, one of the first and second traffic participants designated on the basis of a result of the comparison, and sets the other as a non-display object (see steps ST57-ST60 in FIG. 7). Thus, when a plurality of traffic participants have been recognized as alert objects, the drive assistance system 1 selectively sets a display object and a non-display object in accordance with the result of detection of the recognition by the driver and the result of comparison between the degrees of influence. Accordingly, the drive assistance system 1 does not perform the highlight image processing for all the traffic participants recognized as alert objects, so that the driver can be prevented from being confused and from feeling bothered. Furthermore, every time the recognition of a display object by the driver is detected, the drive assistance system 1 compares the degrees of influence of a plurality of alert objects, and determines an alert object to be set as a display object and an alert object to be set as a non-display object on the basis of the result of comparison, thereby allowing for determining alert objects that the driver should be encouraged to recognize while preventing the driver from being confused and from feeling bothered, so that the safe driving by the driver can be assisted. This arrangement can also contribute to the development of the sustainable transport system.

(2) In the drive assistance system 1, the display object configurator 62 sets, as a display object, only one entity from among a plurality of traffic participants recognized as alert objects, and sets the remaining entities as non-display objects. In the drive assistance system 1, accordingly, even when a plurality of traffic participants have been recognized as alert objects, the highlight image processing only for one of the traffic participants is performed, so that the driver can be prevented from being confused and from feeling bothered.

(3) In the drive assistance system 1, when the recognition, by the driver, of a first traffic participant set as a display object is detected while the highlight image processing for the first traffic participant is performed, the display object configurator 62 sets, as a display object, one of the first and second traffic participants that has the higher degree of influence, and sets the one having the lower degree of influence as a non-display object (see steps ST57-ST60 in FIG. 7). In the drive assistance system 1, accordingly, the driver can be encouraged to recognize one of the first and second traffic participants that has the higher degree of influence, so that the safe driving by the driver can be assisted.

(4) In the drive assistance system 1, when the recognition of the first traffic participant, which has been set as a display object, by the driver is detected while the highlight image processing for the first traffic participant is performed, the display object configurator 62 compares the degree of influence of the first traffic participant with the degree of influence of the second traffic participant. When the degree of influence of the first traffic participant is lower than the degree of influence of the second traffic participant, the display object configurator 62 sets the first traffic participant as a non-display object, and sets the second traffic participant, which has the higher degree of influence, as a display object (see step ST58 in FIG. 7). In the drive assistance system 1, accordingly, the driver can be encouraged to recognize the second traffic participant, i.e., the one having the higher degree of influence from among the first and second traffic participants, so that the safe driving by the driver can be assisted.

(5) In the drive assistance system 1, when the recognition of the first traffic participant, which has been set as a display object, by the driver is detected while the highlight image processing for the first traffic participant is performed, the display object configurator 62 compares the degree of influence of the first traffic participant with the degree of influence of the second traffic participant. When the degree of influence of the first traffic participant is higher than the degree of influence of the second traffic participant, the display object configurator 62 continuously sets the first traffic participant as a display object, and continuously sets the second traffic participant, which has the lower degree of influence, as a non-display object (see step ST60 in FIG. 7). In the drive assistance system 1, accordingly, the highlight image processing for the first traffic participant is continuously performed even after the driver has recognized the first traffic participant, thereby allowing the driver to be encouraged to recognize the first traffic participant, which has the higher degree of influence, so that the safe driving by the driver can be assisted.

(6) In the drive assistance system 1, when the recognition of the first traffic participant, which has been set as a display object, by the driver is detected while the highlight image processing for the first traffic participant is performed, the display object configurator 62 compares the degree of influence of the first traffic participant with the degree of influence of the second traffic participant. When the degree of influence of the first traffic participant is equal to the degree of influence of the second traffic participant, the display object configurator 62 sets the first traffic participant, which has already been recognized by the driver, as a non-display object, and sets the second traffic participant, which has not been recognized by the driver yet, as a display object (see step ST58 in FIG. 7). In the drive assistance system 1, accordingly, when the degrees of influence of the first and second traffic participants are equal, the driver can be encouraged to recognize the second traffic participant that has not been recognized by the driver yet, so that the safe driving by the driver can be assisted.

(7) In the drive assistance system 1, the alert object recognizer 61 or the display object configurator 62 calculates the degrees of influence of the first and second traffic participants on the basis of movement state information pertaining to the movement state of nearby traffic participants. In the drive assistance system 1, accordingly, the degrees of influence on the safe travel of the vehicle V can be accurately calculated in consideration of the movement state of the first and second traffic participants, so that an entity that should be recognized by the driver without fail, from among the first and second traffic participants, can be set as a display object.

(8) In the drive assistance system 1, the driver-recognition detection device 4 can detect that the driver has visually recognized a nearby traffic participant by detecting whether the driver has recognized the nearby traffic participant on the basis of image data pertaining to the face of the driver.

(9) In the drive assistance system 1, the alert object recognizer 61 or the display object configurator 62 detects or predicts the behavior of the first and second traffic participants on the basis of the movement state information pertaining to nearby traffic participants, and calculates the individual degrees of influence on the basis of a result of the detection or prediction. In the drive assistance system 1, accordingly, the individual degrees of influence can be accurately calculated with the result of detection or prediction of the behavior of the first and second traffic participants being reflected, so that an entity that should be recognized by the driver without fail, from among the first and second traffic participants, can be set as a display object.

(10) In the drive assistance system 1, the alert object recognizer 61 or the display object configurator 62 predicts the behavior of the first and second traffic participants on the basis of traffic environment information pertaining to the traffic environment of the vicinity of the vehicle V, so that the alert object recognizer or the display object configurator can accurately predict the behavior of the first and second traffic participants and, in the end, can accurately calculate the individual degrees of influence. In the drive assistance system 1, accordingly, an entity that should be recognized by the driver without fail, from among the first and second traffic participants, can be set as a display object.

(11) In the drive assistance system 1, the alert object recognizer 61 or the display object configurator 62 calculates the degrees of influence of the first and second traffic participants on the basis of the movement state information and the driver state information, so that the alert object recognizer or the display object configurator can accurately calculate the individual degrees of influence with the driving ability of the driver of the vehicle V at that time being reflected. In the drive assistance system 1, accordingly, an entity that should be recognized by the driver without fail, from among the first and second traffic participants, can be set as a display object.

(12) In the drive assistance system 1, when the recognition of a third traffic participant, which has been set as a display object, by the driver is detected while the highlight image processing for the third traffic participant is performed, the display object configurator 62 sets the third traffic participant as a non-display object, and ends the highlight image processing (see steps ST21-ST25 in FIG. 5). In this way, the driver can be prevented from feeling bothered due to the highlight image processing continuing to be performed even after the driver has recognized the third traffic participant. Afterward, if the degree of influence of the third traffic participant has increased by at least a prescribed width threshold in comparison to a time point at which the third traffic participant was set as a non-display object or a time point at which the recognition by the driver was detected, the display object configurator 62 sets the third traffic participant as a display object again and causes the highlight image processing to be started again (see steps ST13-ST14 in FIG. 4 and steps ST31-ST35 in FIG. 9). In the drive assistance system 1, accordingly, even after the driver has recognized the third traffic participant, the highlight image processing for the same third traffic participant is performed in accordance with a later change in the situation, so that the safe travel of the driver can be assisted.

(13) In the drive assistance system 1, when the display object configurator 62 has set, as a display object, a fourth traffic participant recognized as an alert object and then a prescribed highlighting period has elapsed or the recognition of the display object by the driver has been detected, the display object configurator 62 sets the fourth traffic participant as a non-display object, and ends the highlight image processing (see steps ST24-ST25 in FIG. 5). In the drive assistance system 1, accordingly, the driver can be prevented from feeling bothered due to the highlight image processing being performed continuously over a long period of time. In the drive assistance system 1, moreover, the highlighting period is set on the basis of the degree of influence of the fourth traffic participant (see step ST22 in FIG. 5), so that the highlighting period can be set to an appropriate length for the degree of influence of the fourth traffic participant.

(14) In the drive assistance system 1, the alert object recognizer 61 recognizes, as an alert object, an entity having a degree of influence that is greater than a degree-of-influence threshold from among traffic participants recognized as nearby traffic participants, and sets the degree-of-influence threshold on the basis of the traffic environment information. In this way, the frequency with which the highlight image processing is performed can be changed in accordance with a change in the traffic environment of the vicinity of the vehicle V so that the driver can be prevented from feeling bothered due to the highlight image processing being frequently performed.

(15) In the drive assistance system 1, the alert object recognizer 61 recognizes, as an alert object, an entity having a degree of influence that is greater than a degree-of-influence threshold from among traffic participants recognized as nearby traffic participants, and sets the degree-of-influence threshold on the basis of the driver state information. In this way, the frequency with which the highlight image processing is performed can be changed in accordance with the state of the driver at that time, so that the safe travel of the driver can be assisted.

(16) In the drive assistance system 1, in the highlight image processing, the display controller 63 establishes, as a forward display region, a portion of the windshield 51 of the forward display 50 that shows an image of the display object, and displays a highlight image 631 within the forward display region in an overlaid manner so as to highlight the presence of the display object. In this way, the driver can easily recognize the presence of a display object forward of the vehicle V.

(17) In the drive assistance system 1, in the highlight image processing, the display controller 63 establishes, as a rearward display region, a portion of the rearward display 53 that shows an image of the display object, and displays a highlight image 631 within the rearward display region in an overlaid manner so as to highlight the presence of the display object. In this way, the driver can easily recognize the presence of a display object rearward of the vehicle V.

One embodiment of the present invention has been described so far, but the present invention is not limited to this. The configurations of details may be changed, as appropriate, within the scope of the spirit of the present invention.

In the above-described embodiment, for example, the vehicle-mounted external-area recognition device 2 recognizes nearby traffic participants and a traffic environment for the vehicle V on the basis of information acquired using vehicle-mounted sensors that travels with the vehicle V, such as the camera units 21a-21b and the lidar units 22a-22e. However, the present invention is not limited to this. The vehicle-mounted external-area recognition device 2 may recognize nearby traffic participants and a traffic environment for the vehicle V on the basis of information acquired via, for example, inter-vehicle communication between the vehicle V and the nearby traffic participants or wireless communication between the vehicle V and a traffic management server.

What is claimed is:

1. A drive assistance system comprising:
   an external-area recognizer that recognizes traffic participants in a vicinity of a subject vehicle as nearby traffic participants;
   an alert object recognizer that recognizes, as alert objects, entities having a high degree of influence on safe travel of the subject vehicle from among the traffic participants recognized as the nearby traffic participants;
   a display object configurator that sets, as a display object or a non-display object, each of the traffic participants recognized as the alert objects;
   a display controller that performs, for a display provided at a location capable of being viewed by a driver of the subject vehicle, highlight image processing for highlighting a presence of the traffic participant set as the display object; and
   a driver recognition detector that detects whether the driver has recognized the nearby traffic participants, wherein
   when a first traffic participant set as the display object and a second traffic participant set as the non-display object are present in the vicinity of the subject vehicle and recognized as the alert objects with recognition of the first traffic participant by the driver being detected while the highlight image processing is performed, the display object configurator compares the degrees of influence of the first and second traffic participants, sets, as the display object, one of the first and second traffic participants designated on a basis of a result of the comparison, and sets another as the non-display object.

2. The drive assistance system according to claim 1, wherein
   the display object configurator sets, as the display object, only one entity from among the plurality of traffic participants recognized as the alert objects, and sets remaining entities as the non-display objects.

3. The drive assistance system according to claim 2, wherein
   the display object configurator sets, as the display object, the traffic participant having a higher degree of influence among the first and second traffic participants, and sets the traffic participant having a lower degree of influence as the non-display object.

4. The drive assistance system according to claim 3, wherein
   when a first degree of influence of the first traffic participant is lower than a second degree of influence of the second traffic participant, the display object configurator sets the first traffic participant as the non-display object, and sets the second traffic participant as the display object.

5. The drive assistance system according to claim 4, wherein
   when the first degree of influence is higher than the second degree of influence, the display object configurator continuously sets the first traffic participant as the display object, and continuously sets the second traffic participant as the non-display object.

6. The drive assistance system according to claim 5, wherein
   when the first degree of influence is equal to the second degree of influence, the display object configurator sets the first traffic participant as the non-display object, and sets the second traffic participant as the display object.

7. The drive assistance system according to claim 4, wherein
   the external-area recognizer acquires movement state information pertaining to a movement state of the nearby traffic participants, and
   the alert object recognizer or the display object configurator calculates the first and second degrees of influence on a basis of the movement state information.

8. The drive assistance system according to claim 1, wherein the driver recognition detector includes an imager for imaging a face of the driver, and detects whether the driver has recognized the nearby traffic participants on a basis of image data acquired by the imager.

9. The drive assistance system according to claim 7, wherein
the alert object recognizer or the display object configurator detects or predicts a behavior of the first and second traffic participants on a basis of the movement state information, and calculates the first and second degrees of influence on a basis of a result of the detection or prediction.

10. The drive assistance system according to claim 9, wherein
the external-area recognizer acquires traffic environment information pertaining to a traffic environment of the vicinity of the subject vehicle, and
the alert object recognizer or the display object configurator predicts the behavior of the first and second traffic participants on a basis of the traffic environment information.

11. The drive assistance system according to claim 7, further comprising:
a driver-state acquirer that acquires driver state information correlated with a driving ability of the driver, wherein
the alert object recognizer or the display object configurator calculates the first and second degrees of influence on a basis of the movement state information and the driver state information.

12. The drive assistance system according to claim 1, wherein
in response to detection of the driver recognizing a third traffic participant set as the display object, the display object configurator sets the third traffic participant as the non-display object, and then sets the third traffic participant as the display object again if the degree of influence of the third traffic participant has increased in comparison to a time point at which the third traffic participant was set as the non-display object or a time point at which the recognition by the driver was detected.

13. The drive assistance system according to claim 12, wherein
when the display object configurator has set, as the display object, a fourth traffic participant recognized as the alert object and then a prescribed highlighting period has elapsed or recognition of the display object by the driver has been detected, the display object configurator sets the fourth traffic participant as the non-display object, and
the highlighting period is set on a basis of the degree of influence of the fourth traffic participant.

14. The drive assistance system according to claim 1, wherein
the external-area recognizer acquires traffic environment information pertaining to a traffic environment of the vicinity of the subject vehicle, and
the alert object recognizer recognizes, as the alert object, an entity having the degree of influence that is greater than a prescribed degree-of-influence threshold from among the traffic participants recognized as the nearby traffic participants, and
the degree-of-influence threshold is set on a basis of the traffic environment information.

15. The drive assistance system according to claim 1, further comprising:
a driver-state acquirer that acquires driver state information correlated with a driving ability of the driver, wherein
the alert object recognizer recognizes, as the alert object, an entity having the degree of influence that is greater than a prescribed degree-of-influence threshold from among the traffic participants recognized as the nearby traffic participants, and
the degree-of-influence threshold is set on a basis of the driver state information.

16. The drive assistance system according to claim 1, wherein
the display includes a forward display for showing an image of an area forward of the subject vehicle, and
in the highlight image processing, the display controller establishes, as a forward display region, a portion of the forward display that shows an image of the display object, and displays a highlight image within the forward display region in an overlaid manner so as to highlight a presence of the display object.

17. The drive assistance system according to claim 16, wherein
the display includes a rearward display for showing an image of an area rearward of the subject vehicle, and
in the highlight image processing, the display controller establishes, as a rearward display region, a portion of the rearward display that shows an image of the display object, and displays a highlight image within the rearward display region in an overlaid manner so as to highlight the presence of the display object.

* * * * *